(12) United States Patent  
Carsello

(10) Patent No.: US 10,992,410 B2  
(45) Date of Patent: Apr. 27, 2021

(54) BLIND DETECTION AND SYNCHRONIZATION OF DATA PACKETS

(71) Applicant: SR Technologies, Inc., Sunrise, FL (US)

(72) Inventor: Stephen R. Carsello, Plantation, FL (US)

(73) Assignee: SR Technologies, Inc., Sunrise, FL (US)

(*) Notice: Subject to any disclaimer, the term of this patent is extended or adjusted under 35 U.S.C. 154(b) by 0 days.

(21) Appl. No.: 16/887,512

(22) Filed: May 29, 2020

(65) Prior Publication Data

US 2020/0295869 A1 Sep. 17, 2020

Related U.S. Application Data

(63) Continuation of application No. 16/537,110, filed on Aug. 9, 2019, now Pat. No. 10,707,993.

(Continued)

(51) Int. Cl.
*H04W 84/12* (2009.01)
*H04L 1/00* (2006.01)
(Continued)

(52) U.S. Cl.
CPC ............ *H04L 1/0038* (2013.01); *H04B 7/26* (2013.01); *H04L 7/042* (2013.01); *H04L 27/144* (2013.01); *G06F 16/27* (2019.01); *H04W 84/12* (2013.01)

(58) Field of Classification Search
CPC ............ H04W 84/12; H04W 52/0229; H04W 72/0453; H04W 80/02; H04W 72/0446; H04W 52/0235; H04W 16/28; H04W 24/10; H04W 28/06; H04W 48/12; H04W 52/0216; H04W 56/001; H04L 27/2613; H04L 27/2602; H04L 5/0007; H04L 27/26; H04L 5/0023; H04L 5/0048; H04L 5/0053; H04L 5/0044; H04L 1/0057; H04L 27/2607; H04L 27/2605; H04B 7/0617;

(Continued)

(56) References Cited

U.S. PATENT DOCUMENTS 7,577,122 B1 8/2009 Schultz et al.
2005/0032479 A1 2/2005 Miller et al.
(Continued)

*Primary Examiner* — Eva Y Puente
(74) *Attorney, Agent, or Firm* — Christopher & Weisberg, P.A.

(57) ABSTRACT

A method and receiver are disclosed for the blind detection and synchronization of data packets are disclosed. According to one aspect, a method includes generating a running histogram of received sample values for each of a plurality of frequency bins and symbol timing phases, the running histogram spanning a most recent block of symbols representing a candidate synchronization (sync) word. The method also includes, for each symbol interval: analyzing the histogram to estimate symbol timing phase, DC offset and frequency offset. The method also includes determining a first candidate sync word based at least in part on the symbol timing phase, frequency offset and corresponding DC offset the first candidate sync word representing a most recent vector of bits associated with the first candidate sync word. The method further includes discerning a lower address part (LAP) obtained from the first candidate sync word to enable detection of a packet.

20 Claims, 19 Drawing Sheets

Related U.S. Application Data

(60) Provisional application No. 62/721,942, filed on Aug. 23, 2018.

(51) Int. Cl.
*H04L 7/04* (2006.01)
*H04B 7/26* (2006.01)
*H04L 27/144* (2006.01)
*G06F 16/27* (2019.01)

(58) Field of Classification Search
CPC .. H04B 7/0695; H04B 7/0452; H04B 7/0413; H04B 7/0417; H04B 7/063; H04B 7/0697; H04B 7/088; H04B 11/00; H04B 1/70752; H04B 7/04; H04B 7/0456; H04B 7/0634
USPC ......................................................... 375/343
See application file for complete search history.

(56) References Cited

U.S. PATENT DOCUMENTS

| | | |
|---|---|---|
| 2005/0063480 A1 | 3/2005 | Sang et al. |
| 2005/0172025 A1* | 8/2005 | Colas ...................... H04L 49/90 |
| | | 709/226 |
| 2014/0101485 A1 | 4/2014 | Wegener |
| 2014/0286174 A1 | 9/2014 | Iizuka et al. |
| 2017/0223734 A1* | 8/2017 | Lin ..................... H04W 72/042 |
| 2018/0109354 A1 | 4/2018 | Ahirwar et al. |
| 2019/0215702 A1* | 7/2019 | Yun ......................... H04L 27/26 |

* cited by examiner

Construction of the Sync Word

Packet Header format

Bit Stream Processing for Classic Bluetooth Packet Header

Bit Stream Processing for Classic Bluetooth Payload

Signal Processing Line-Up for Limiter-Discriminator Receiver

| Freq Bin | Phase 0 | Phase 1 | Phase 2 | Phase 3 | Phase 4 | Phase 5 | Phase 6 | Phase 7 |
|---|---|---|---|---|---|---|---|---|
| -318750 | 0 | 0 | 0 | 0 | 0 | 0 | 0 | 0 |
| -286875 | 0 | 0 | 0 | 0 | 0 | 0 | 0 | 0 |
| -255000 | 0 | 0 | 0 | 0 | 0 | 0 | 0 | 0 |
| -223125 | 0 | 0 | 0 | 0 | 0 | 0 | 0 | 0 |
| -191250 | 9 | 5 | 0 | 0 | 0 | 6 | 8 | 8 |
| -159375 | 10 | 14 | 19 | 10 | 19 | 13 | 11 | 11 |
| -127500 | 0 | 0 | 0 | 19 | 1 | 0 | 0 | 0 |
| -95625 | 0 | 7 | 18 | 8 | 17 | 4 | 0 | 0 |
| -63750 | 4 | 11 | 0 | 0 | 0 | 14 | 4 | 0 |
| -31875 | 14 | 0 | 0 | 0 | 0 | 0 | 14 | 5 |
| 0 | 0 | 0 | 0 | 0 | 0 | 0 | 0 | 28 |
| 31875 | 13 | 0 | 0 | 0 | 0 | 0 | 12 | 3 |
| 63750 | 5 | 12 | 0 | 0 | 0 | 9 | 6 | 0 |
| 95625 | 0 | 6 | 18 | 9 | 18 | 9 | 0 | 0 |
| 127500 | 0 | 0 | 0 | 17 | 0 | 0 | 0 | 0 |
| 159375 | 5 | 6 | 11 | 3 | 11 | 7 | 6 | 5 |
| 191250 | 6 | 5 | 0 | 0 | 0 | 4 | 5 | 6 |
| 223125 | 0 | 0 | 0 | 0 | 0 | 0 | 0 | 0 |
| 255000 | 0 | 0 | 0 | 0 | 0 | 0 | 0 | 0 |
| 286875 | 0 | 0 | 0 | 0 | 0 | 0 | 0 | 0 |
| 318750 | 0 | 0 | 0 | 0 | 0 | 0 | 0 | 0 |

Wireframe Contour Diagram
Phase vs Frequency Bin
Clean Signal

FIG. 14

| Freq Bin | Phase 0 | Phase 1 | Phase 2 | Phase 3 | Phase 4 | Phase 5 | Phase 6 | Phase 7 |
|---|---|---|---|---|---|---|---|---|
| -318750 | 0 | 0 | 0 | 0 | 0 | 0 | 0 | 0 |
| -286875 | 0 | 0 | 0 | 0 | 0 | 0 | 0 | 0 |
| -255000 | 0 | 0 | 0 | 0 | 0 | 0 | 0 | 0 |
| -223125 | 0 | 0 | 0 | 0 | 0 | 0 | 0 | 0 |
| -191250 | 0 | 0 | 0 | 0 | 0 | 0 | 0 | 0 |
| -159375 | 0 | 0 | 0 | 0 | 0 | 0 | 0 | 0 |
| -127500 | 0 | 0 | 0 | 0 | 0 | 0 | 0 | 2 |
| -95625 | 16 | 16 | 13 | 8 | 11 | 16 | 16 | 13 |
| -63750 | 0 | 0 | 3 | 16 | 5 | 0 | 0 | 1 |
| -31875 | 0 | 0 | 15 | 7 | 15 | 0 | 0 | 0 |
| 0 | 1 | 15 | 0 | 0 | 0 | 15 | 0 | 0 |
| 31875 | 12 | 0 | 0 | 0 | 0 | 0 | 14 | 0 |
| 63750 | 2 | 0 | 0 | 0 | 0 | 0 | 1 | 21 |
| 95625 | 4 | 0 | 0 | 0 | 0 | 0 | 3 | 9 |
| 127500 | 11 | 2 | 0 | 0 | 0 | 2 | 12 | 0 |
| 159375 | 0 | 13 | 3 | 0 | 4 | 13 | 0 | 0 |
| 191250 | 0 | 0 | 12 | 9 | 11 | 0 | 0 | 0 |
| 223125 | 6 | 7 | 14 | 20 | 13 | 6 | 6 | 6 |
| 255000 | 14 | 13 | 6 | 6 | 7 | 14 | 14 | 14 |
| 286875 | 0 | 0 | 0 | 0 | 0 | 0 | 0 | 0 |
| 318750 | 0 | 0 | 0 | 0 | 0 | 0 | 0 | 0 |

FIG. 15

Wireframe Contour Diagram
Phase vs Frequency Bin
Clean, Offset Signal

| Freq Bin | Phase 0 | Phase 1 | Phase 2 | Phase 3 | Phase 4 | Phase 5 | Phase 6 | Phase 7 |
|---|---|---|---|---|---|---|---|---|
| -318750 | 0 | 0 | 0 | 0 | 0 | 0 | 0 | 0 |
| -286875 | 0 | 0 | 0 | 0 | 0 | 0 | 0 | 0 |
| -255000 | 1 | 1 | 0 | 0 | 0 | 0 | 0 | 1 |
| -223125 | 3 | 3 | 3 | 2 | 0 | 1 | 3 | 2 |
| -191250 | 4 | 3 | 4 | 4 | 6 | 6 | 3 | 4 |
| -159375 | 1 | 1 | 3 | 3 | 4 | 3 | 5 | 2 |
| -127500 | 1 | 5 | 3 | 8 | 4 | 3 | 2 | 2 |
| -95625 | 7 | 6 | 9 | 9 | 11 | 2 | 0 | 2 |
| -63750 | 3 | 3 | 8 | 4 | 5 | 9 | 4 | 4 |
| -31875 | 7 | 9 | 1 | 1 | 1 | 7 | 10 | 7 |
| 0 | 10 | 3 | 1 | 0 | 0 | 0 | 7 | 13 |
| 31875 | 5 | 4 | 1 | 1 | 0 | 3 | 8 | 7 |
| 63750 | 3 | 5 | 6 | 2 | 5 | 10 | 6 | 5 |
| 95625 | 3 | 2 | 6 | 14 | 13 | 6 | 2 | 0 |
| 127500 | 4 | 9 | 9 | 5 | 5 | 3 | 4 | 5 |
| 159375 | 6 | 5 | 4 | 6 | 6 | 7 | 5 | 6 |
| 191250 | 4 | 2 | 5 | 6 | 5 | 4 | 4 | 2 |
| 223125 | 2 | 5 | 2 | 0 | 0 | 1 | 2 | 2 |
| 255000 | 2 | 0 | 1 | 0 | 0 | 1 | 1 | 2 |
| 286875 | 0 | 0 | 0 | 1 | 1 | 0 | 0 | 0 |
| 318750 | 19 | 21 | 20 | 17 | 17 | 23 | 22 | 21 |

| Bin (Hz) | Phase 0 | Phase 1 | Phase 2 | Phase 3 | Phase 4 | Phase 5 | Phase 6 | Phase 7 |
|---|---|---|---|---|---|---|---|---|
| -318750 | 15 | 11 | 13 | 13 | 12 | 13 | 14 | 18 |
| -286875 | 2 | 4 | 1 | 1 | 1 | 1 | 2 | 0 |
| -255000 | 1 | 1 | 1 | 2 | 3 | 1 | 3 | 1 |
| -223125 | 2 | 4 | 4 | 2 | 1 | 2 | 2 | 3 |
| -191250 | 1 | 5 | 2 | 3 | 3 | 5 | 1 | 3 |
| -159375 | 4 | 2 | 2 | 0 | 2 | 3 | 1 | 2 |
| -127500 | 1 | 0 | 1 | 1 | 4 | 1 | 2 | 0 |
| -95625 | 1 | 1 | 0 | 2 | 0 | 0 | 3 | 1 |
| -63750 | 1 | 2 | 1 | 2 | 3 | 2 | 1 | 1 |
| -31875 | 2 | 2 | 4 | 1 | 2 | 0 | 0 | 1 |
| 0 | 2 | 3 | 3 | 3 | 2 | 7 | 6 | 2 |
| 31875 | 5 | 4 | 3 | 1 | 0 | 1 | 1 | 2 |
| 63750 | 1 | 2 | 3 | 1 | 2 | 3 | 1 | 0 |
| 95625 | 1 | 1 | 3 | 5 | 4 | 2 | 1 | 2 |
| 127500 | 2 | 1 | 1 | 4 | 3 | 0 | 3 | 3 |
| 159375 | 0 | 0 | 1 | 1 | 0 | 0 | 2 | 3 |
| 191250 | 1 | 1 | 1 | 4 | 1 | 1 | 0 | 0 |
| 223125 | 1 | 0 | 1 | 0 | 2 | 0 | 1 | 2 |
| 255000 | 2 | 1 | 1 | 2 | 1 | 0 | 0 | 0 |
| 286875 | 2 | 0 | 0 | 1 | 3 | 1 | 0 | 1 |
| 318750 | 19 | 21 | 20 | 17 | 17 | 23 | 22 | 21 |

Blind LAP False Detection Probabilities for 100 msec Search Window in Noise-Only

| t | Re-Encode | Decode | Decode / Re-Encode |
|---|---|---|---|
| 6 | 0.341789 | 1.000000 | 0.999487 |
| 5 | 0.066795 | 1.000000 | 0.530090 |
| 4 | 0.009242 | 0.980805 | 0.059897 |
| 3 | $9.73 \cdot 10^{-4}$ | 0.224797 | 0.003971 |
| 2 | $7.47 \cdot 10^{-5}$ | 0.012040 | $1.89 \cdot 10^{-4}$ |
| 1 | $3.73 \cdot 10^{-6}$ | $3.78 \cdot 10^{-4}$ | $5.91 \cdot 10^{-6}$ |
| 0 | $9.10 \cdot 10^{-8}$ | $5.82 \cdot 10^{-6}$ | $9.10 \cdot 10^{-8}$ |

2150

BLIND DETECTION AND SYNCHRONIZATION OF DATA PACKETS

CROSS-REFERENCE TO RELATED APPLICATIONS

This application is related to and claims priority to U.S. patent application Ser. No. 16/537,110, filed on Aug. 9, 2019, entitled "BLIND DETECTION AND SYNCHRONIZATION OF DATA PACKETS," which claims priority to U.S. Provisional Patent Application No. 62/721,942, filed on Aug. 23, 2018, entitled "BLIND DETECTION AND SYNCHRONIZATION OF DATA PACKETS," the entireties of both of which are incorporated herein by reference.

TECHNICAL FIELD

The present disclosure relates to a method and system for the "blind detection and synchronization" of data packets, such as Bluetooth® data packets, with no a priori knowledge of the piconets from which the packets emerge and no a priori knowledge of any specific device addresses.

BACKGROUND

The Bluetooth® system is specified in "Specification of the Bluetooth® System, Covered Core Package Version: 5.0, Publication Date: Dec. 6, 2016" ("Specification of the Bluetooth® System)". Bluetooth® operates in the unlicensed Industrial, Scientific, and Medical (ISM) band from 2.400 to 2.4835 GHz. Classic Bluetooth Basic Rate (BR) and Bluetooth Low Energy (BLE) employ Gaussian Frequency-Shift Keying (GFSK) as the primary modulation scheme, while Classic Bluetooth Enhanced Data Rate (EDR) incorporates differential phase-shift keying (DPSK) for increased throughput. Classic Bluetooth (BR) may occupy any of 79 radio frequency (RF) channels, spaced by 1 MHz, whereas BLE is limited to 40 RF channels, spaced by 2 MHz. For both BR and BLE, the nominal channel symbol rate is 1 MHz, with a nominal channel symbol duration of 1 µl.

A more complete understanding of the present embodiments, and the attendant advantages and features thereof, will be more readily understood by first describing relevant Bluetooth® system details. Relevant details of the Bluetooth® system are therefore presented herein. A more complete description can be obtained by reference to the Specification of the Bluetooth® System.

Bluetooth® is a time division multiplex (TDM) system basically comprising a "Master" device, which initiates an exchange of data, and a "Slave" device which responds to the Master. The TDMA slot duration is 625 µs, and the maximum payload length is such that certain packet types may extend up to five slots in length. Each device will hop to an RF channel once per packet and Slave devices will utilize the timing of their Master to hop in synchronization.

FIG. 1 is a diagram that shows the format of the unique Bluetooth Device Address (BD_ADDR) 100. The BD_ADDR is split into three parts, lower address part (LAP) 110, upper address part (UAP) 120, and non-significant address part (NAP) 130.

FIG. 2 is a diagram that shows the general format 200 for the Classic Bluetooth BR packet type, which starts with a GFSK Access Code 210. If a packet header follows, the access code is 72 bits long, otherwise the access code is 68 bits long and is known as a shortened access code. For any packet not comprised solely of a shortened Access Code, the Access Code 210 is followed by a 54-bit GFSK Packet Header 220, which is generated by encoding an 18-bit information field using a rate 1/3 repetition code. The Header 220 is followed by the payload 230.

FIG. 3 is a diagram that shows the general format 300 for packets carrying an enhanced data rate (EDR) payload which start with a GFSK Access Code 210 of length 72 bits. The Access Code 210 is followed by a 54-bit GFSK Packet Header 220. The GFSK Packet Header 220 is followed by a guard interval 330 of nominal duration 5 µs, followed by an a priori 11-symbol EDR sync word 340, the DPSK payload 350, and then, finally, two trailer symbols 360.

FIG. 4 is a diagram showing the GFSK Access Code 210, which begins with a 4-bit preamble 410 (either 0101 or 1010), and, for non-shortened Access Codes, ends with a 4-bit trailer 430 (also either 0101 or 1010).

FIG. 5 is a diagram showing the construction of the 64-bit sync word 420. The detailed description for this construction is given in Clause 6.3.3.1 in the Specification of the Bluetooth® System. The sync word 420 generation begins at step 510 or 515 where a 6-bit Barker code is appended to the 24-bit Lower Address Part (LAP) field 110 to form an information sequence. If the most significant bit (MSB) of the LAP is a zero, then the Barker code 001101 is used to form an information sequence at step 510. If the MSB of the LAP is a one, then the Barker code 110010 is used to form an information sequence 515. Step 510 or 515 is followed by step 520 where the information sequence is pre-scrambled by carrying out an exclusive OR (XOR) function with the bits $p_{34} \ldots p_{63}$ of a PN sequence 550 which has a fixed value, generating the data to encode 530. A (64, 30) block codeword 545 is then appended to generate the codeword 540, and the complete PN sequence is XORed to the codeword 540. This step de-scrambles the information part of the codeword 540 and at the same time the parity bits of the codeword are scrambled. Consequently, the original LAP 110 and Barker sequence are ensured a role as part of the access code sync word, and the cyclic properties of the underlying code is removed.

FIG. 6 is a diagram showing the format of the Packet Header 220. The Header 220 includes six fields: LT_ADDR 610, Type 620, Flow 630, ARQN 640, SEQN 650, and HEC 660. The 3-bit LT_ADDR field 610 contains the logical transport address for the packet. The 4-bit Type code 620 specifies which packet type is used. The Flow bit 630 is used for the flow control of packets. The 1-bit acknowledgment indication ARQN 640 is used to inform the source of a successful transfer of payload data with cyclic redundancy check (CRC), and can be positive acknowledge ACK or negative acknowledge NAK. The sequence SEQN bit 650 provides a sequential numbering scheme to order the data packet stream. The header error check HEC 660 is an 8-bit word. Before generating the HEC, the HEC generator is initialized with an 8-bit value. For frequency hop synchronization (FHS) packets sent in master response substate, the upper address part (UAP) 120 of the slave device is used. For frequency hop synchronization (FHS) packets and extended inquiry response packets sent in inquiry response, the default check initialization (DCI), value 0x00, is used. In all other cases, the UAP 120 of the master device is used.

FIG. 7 is a block diagram showing the bit stream processing 700 for encoding the 54-bit Classic Bluetooth Packet Header. A 10-bit message, which includes the 4-bit Packet Header Type Field (PHTF), is first augmented with an 8-bit Header Error Check (HEC), block 710. For packets associated with a specific master or slave, the HEC is generated using the 8-bit Upper Address Part (UAP) 120 of the BD_ADDR 100 for either the master or slave device, otherwise, a Default Check Initialization (DCI) is used. The 18-bit information bit field is then whitened using an a priori 6-bit pseudorandom sequence in block 720, starting at one of 64 possible starting locations or "seeds". The 18-bit, whitened information bit sequence is then encoded in block 730 using rate 1/3 repetition coding, resulting in the 54-bit Packet Header, which is modulated as GFSK. Note that the values provided in this paragraph are examples only. Thus, in other examples, a length of whitened information bit sequence may be other than 18 bits and may be encoded using a repetition rate other than 1/3.

FIG. 8 is a block diagram showing the bit stream processing 800 for a Classic Bluetooth® payload, for which some packet types support two different forms of encryption: CRC 810 and E0 Encryption 820, and AES encryption 830 with CRC 840. For packet types which include a cyclic redundancy check (CRC) 810 and E0 Encryption, the first Encryption Type E0 820 obscures the CRC 810 which cannot be used for the checking of valid packets. For packet types employing the encryption type AES 830, a 32-bit Message Integrity Check (MIC) field is first appended to the user payload, and then encryption is performed prior to encoding the CRC 840. In this case the CRC is unobscured, and, therefore, useful for checking for valid packets. The payload, which includes the message integrity check (MIC) and the CRC, is then whitened 850 using the same seed that was used for the packet header, but advanced by 18 positions. The whitened information payload is encoded using forward error correction (FEC) 860 of rate 1/3, 2/3, or 1, depending on the packet type, where the rate 1/3 code is the aforementioned repetition code, and the rate 2/3 code is a shortened (15,10) Hamming code.

The Bluetooth® transmitter specifications are specified in the Specification of the Bluetooth® System, a summary is herein provided. Both BR and BLE employ a GFSK waveform with normalized Gaussian filter 3-dB frequency bandwidth time, BT=0.5, utilizing a nominal symbol duration of T=1 μs, which may vary, at the transmitter, by as much as ±20 parts per million (ppm) for BR, the modulation index h can vary within the range 0.28≤h≤0.35, with an assumed nominal value of h=0.32. Furthermore, for any BR transmission, the initial center frequency must be within ±75 kHz of the nominal channel frequency, and is, then, allowed to drift by as much as ±25 kHz for a single-slot packet, and ±40 kHz for a multi-slot packet, with a maximum drift rate of 400 Hz per μs.

In the normal case, the BR receiver has a priori knowledge of the Access Code 210 and can therefore correlate to the sync word 420 establishing the packet time of arrival and instantaneous offset frequency. When employing a Bluetooth® monitoring receiver that is listening for Bluetooth® packets on a particular channel, or indeed on all the channels, the LAP 110 is not known and hence the detector cannot synchronize to a packet using known techniques. Furthermore, once synchronized to a packet, there is no a priori knowledge of the whitening sequence generator's initial state/seed, which can be one of 64 possibilities. Finally, encoding of, both the 8-bit Header Error Check (HEC) 710, transmitted during the GFSK Packet Header 220, and the 16-bit payload CRC 840, which appears at the end of certain packet types, both utilize the 8-bit Upper Address Part (UAP) 120 of the BD_ADDR 100, of which, again, the detector has no a priori knowledge.

SUMMARY

A method and receiver are disclosed for the blind detection and synchronization of data packets are disclosed. According to one aspect, a method includes generating a running histogram of received sample values for each of a plurality of frequency bins and symbol timing phases, the running histogram spanning a most recent block of symbols representing a candidate synchronization (sync) word. The method also includes, for each symbol analyzing the histogram to estimate symbol timing phase, DC offset and frequency offset and determining a first candidate sync word based at least in part on the symbol timing phase, frequency offset and corresponding DC offset, the first candidate sync word representing a most recent vector of bits associated with the first candidate sync word. The method further includes discerning a lower address part (LAP) obtained from the first sync word to enable detection of a data packet.

According to this aspect, in some embodiments, the first candidate sync word is 64 bits of which 24 bits form the LAP. In some embodiments, the method further includes estimating a sample time associated with a center of the first candidate sync word. In some embodiments, the estimated sample time is constrained to mitigate errors introduced by symbol slip and symbol repeat. the In some embodiments, the symbol timing phase, frequency offset and DC offset are estimated based at least in part on a symbol-template correlation function. In some embodiments, the symbol-template correlation function is based at least in part on a summation of bit-count values of the histogram along a frequency axis of the histogram. In some embodiments, the decoding of the LAP comprises, for each symbol interval: extracting the LAP from the first candidate sync word; re-encoding the LAP to generate a second candidate sync word; comparing the second candidate sync word to the first candidate sync word; and when the second candidate sync word matches the first candidate sync word to within a predetermined number of bit errors, outputting the LAP and declaring a detected packet. In some embodiments, the decoding of the LAP comprises, for each symbol interval: decoding the first candidate sync word to a closest matching code word to produce a second candidate sync word; finding a valid codeword based on the first and second candidate sync words and when a valid codeword is found, outputting an LAP and declaring a detected packet. In some embodiments, the decoding of the LAP comprises: decoding the first candidate sync word to a closest matching code word; extracting the LAP from an LAP portion of the closest matching code word, and re-encoding the extracted LAP to produce a second sync word; comparing the second sync word to the first candidate sync word; and when the second sync word matches the first candidate sync word to within a predetermined number of bit errors, outputting the LAP and declaring a detected packet. In some embodiments, the histogram is of size $(2N_f+1) \times N_s$, where $N_f$ is a number of frequency bins in the histogram and $N_s$ is a number of samples per symbol.

According to another aspect, a receiver configured for blind detection of received data packets is provided. The receiver includes processing circuitry configured to: generate a running histogram of received sample values for each of a plurality of frequency bins and symbol timing phases, the running histogram spanning a most recent block of symbols representing a candidate synchronization (sync) word. For each symbol interval, the processing circuitry is further configured to analyze the histogram to estimate symbol timing phase, DC offset and frequency offset, and determine a first candidate sync word based at least in part on the symbol timing phase, frequency offset and corresponding DC offset, the first candidate sync word representing a most recent vector of bits associated with the first candidate sync word. The processing circuitry is further configured to discern a lower address part (LAP) obtained from the first sync candidate word to enable detection of a data packet.

According to this aspect, in some embodiments, the first candidate sync word is 64 bits of which 24 bits form the LAP. In some embodiments, the processing circuitry is further configured to estimate a sample time associated with a center of the first candidate sync word. In some embodiments, the estimated sample time is constrained to mitigate errors introduced by symbol slip and symbol repeat. In some embodiments, the symbol timing phase, frequency offset and DC offset are estimated based at least in part on a symbol-template correlation function. In some embodiments, the symbol-template correlation function is based at least in part on a summation of bit-count values of the histogram along a frequency axis of the histogram. In some embodiments, the decoding of the LAP comprises, for each symbol interval: extracting the LAP from the first candidate sync word; re-encoding the LAP to generate a second candidate sync word; comparing the second candidate sync word to the first candidate sync word; and when the second candidate sync word matches the first candidate sync word to within a predetermined number of bit errors, outputting the LAP and declaring a detected packet. In some embodiments, the decoding of the LAP comprises, for each symbol interval: decoding the first candidate sync word to a closest matching code word to produce a second candidate sync word; and finding a valid codeword based on the first and second candidate sync words and when a valid codeword is found, outputting an LAP and declaring a detected packet. In some embodiments, the decoding of the LAP comprises, for each symbol interval: decoding the first candidate sync word to a closest matching code word; extracting the LAP from an LAP portion of the closest matching code word to produce a second candidate sync word, and re-encoding the extracted LAP; comparing the second sync word to the first sync word; and when the second sync word matches the first sync word to within a predetermined number of bit errors, outputting the LAP and declaring a detected packet.

According to yet another aspect, a method for blind detection of data packets received by a Bluetooth® receiver is provided. The method includes generating a running histogram of received sample values for each of a plurality of frequency bins and symbol timing phases, the running histogram spanning a most recent block of symbols representing a candidate sync word. The method includes analyzing the histogram to estimate symbol timing, DC offset and frequency offset; determining a first candidate sync word based at least in part on the symbol timing phase, frequency offset and corresponding DC offset, the first candidate sync word having 64 bits of which 24 bits form a lower address part, LAP; and discerning the LAP obtained from the first candidate sync word to enable detection of the Bluetooth® packet.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 14 is an example of a 2-dimensional histogram for offset frequency;

FIG. 15 is a wireframe contour graph corresponding to the histogram of FIG. 14;

FIG. 20 is an example of the procedure based upon a histogram;

DETAILED DESCRIPTION

A scheme that employs a detector that synchronizes to a BR packet with no a priori knowledge of the LAP may then be capable of a determination of the packet type such that the packet details may be extracted and delivered to a higher layer. This is termed "Blind Demodulation of Bluetooth". This disclosure relates to the blind detection and synchronization of Bluetooth® packets. The detector, for a given RF channel, synchronizes to in-coming packets, without any a priori knowledge of prospective LAPs and to output the detected LAP.

Figure 1:
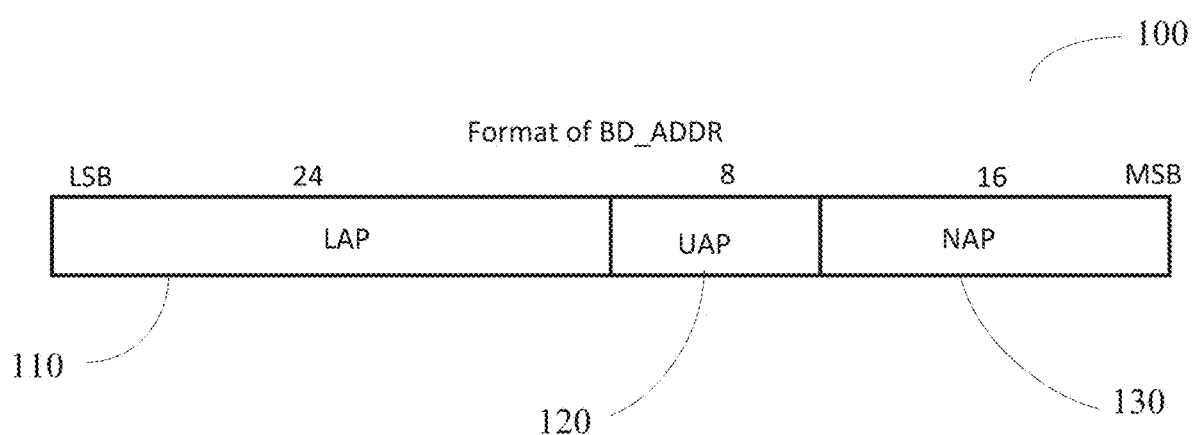
FIG. 1 is a diagram that shows the format of the unique Bluetooth Device Address (BD_ADDR)
Figure 2:
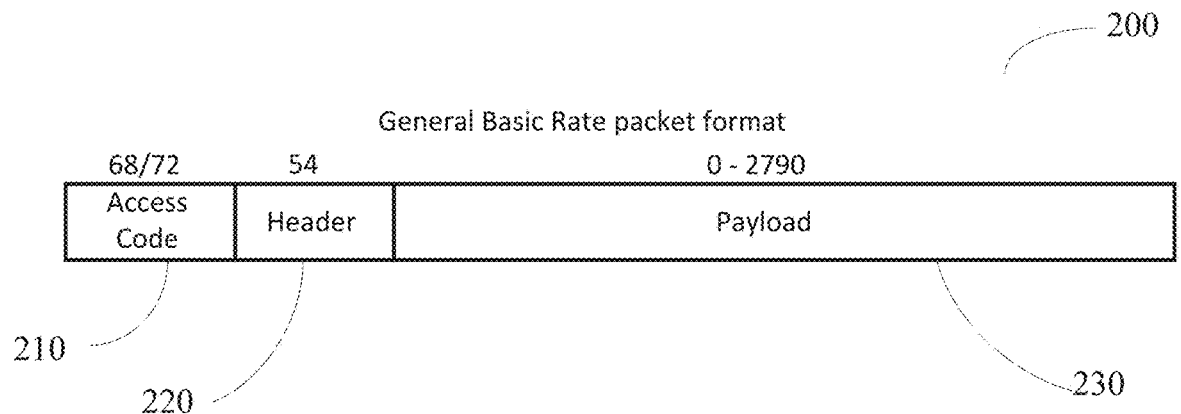
FIG. 2 is a diagram that shows the general format for the Classic Bluetooth BR packet type.
Figure 3:
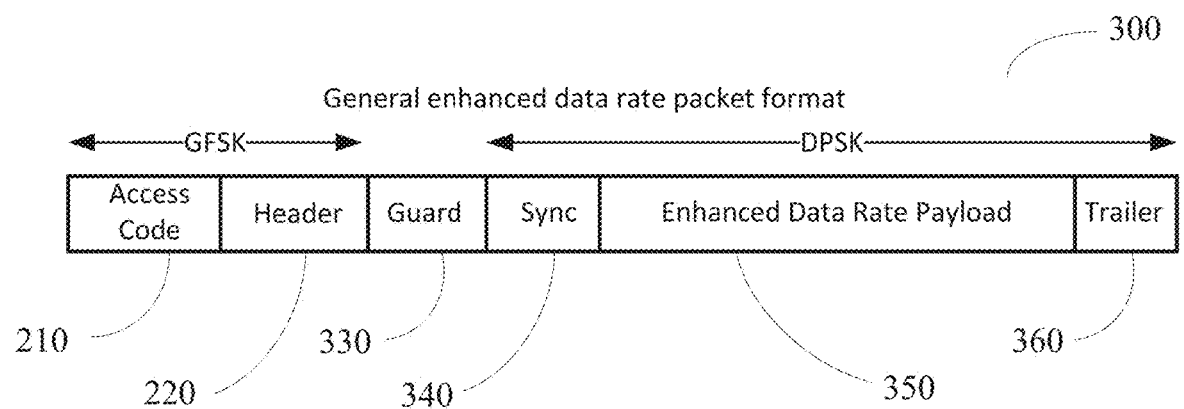
FIG. 3 is a diagram that shows the general format for packets carrying an EDR payload.
Figure 4:
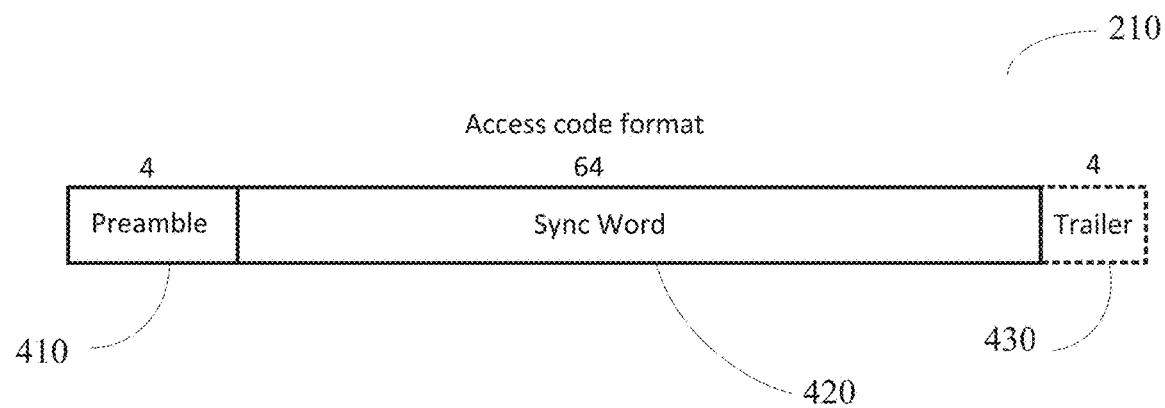
FIG. 4 is a diagram showing the GFSK Access Code.
Figure 5:
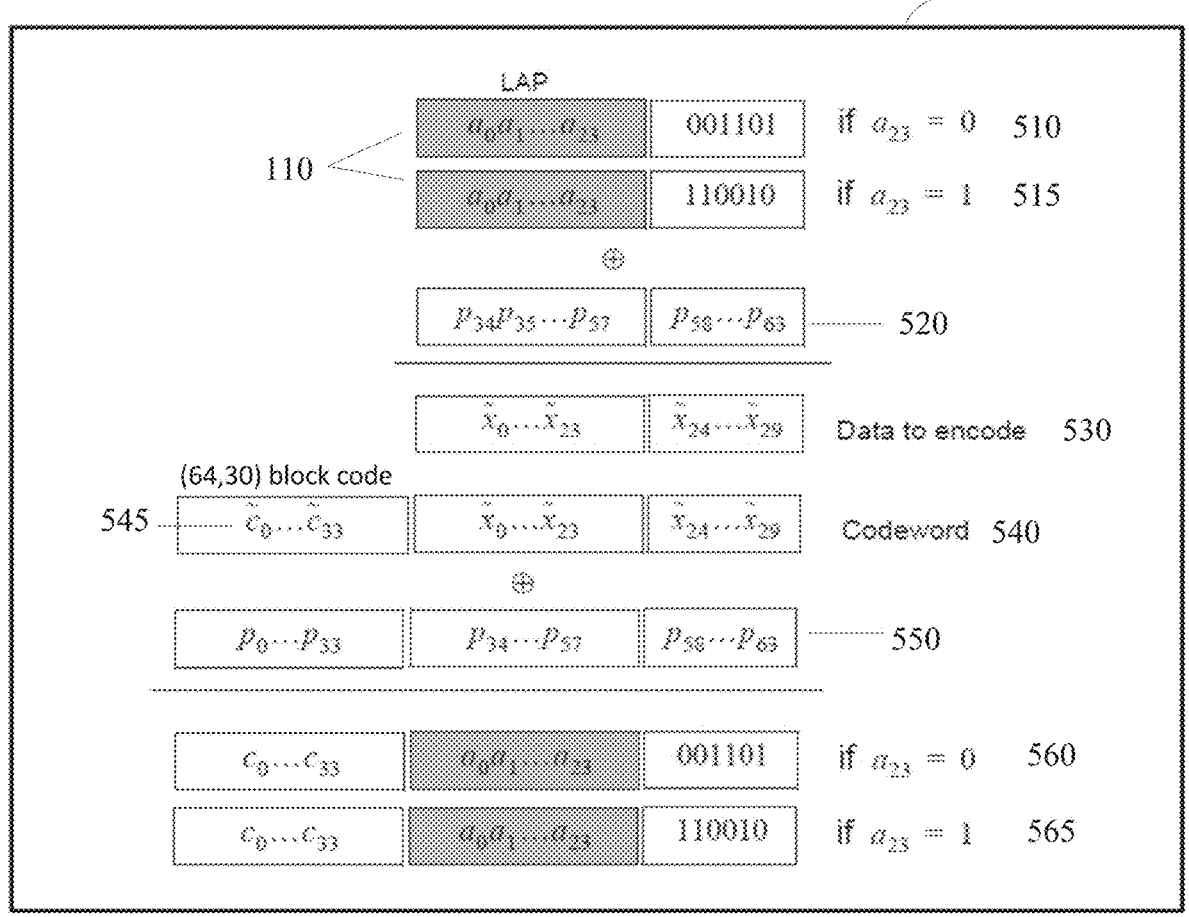
FIG. 5 is a diagram showing the construction of the 64-bit sync word.
Figure 6:
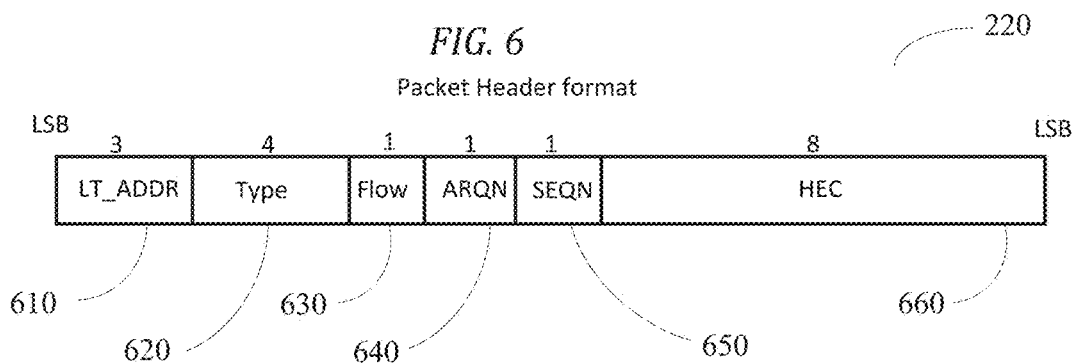
FIG. 6 is a diagram showing the format of the Packet Header.
Figure 7:
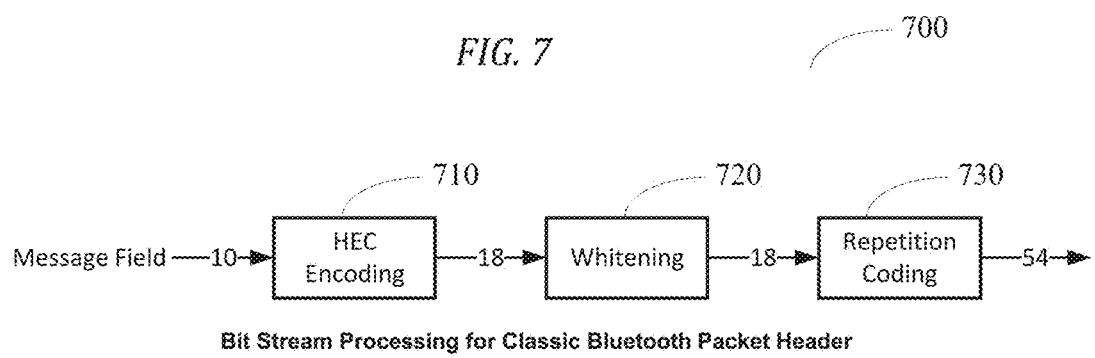
FIG. 7 is a block diagram showing the bit stream processing for encoding the 54-bit Classic Bluetooth Packet Header.
Figure 8:
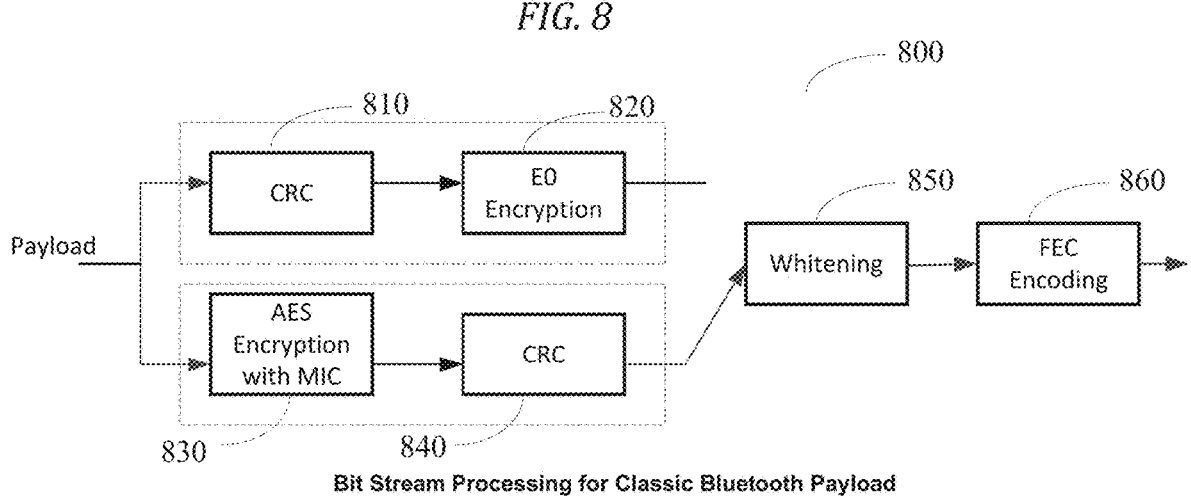
FIG. 8 is a block diagram showing the bit stream processing for a Classic Bluetooth payload, for which some packet types support two different forms of encryption.

Initially, it is noted that as described in FIG. 5, the unscrambled LAP 110 appears in the transmitted sync word bit stream.

Figure 9:
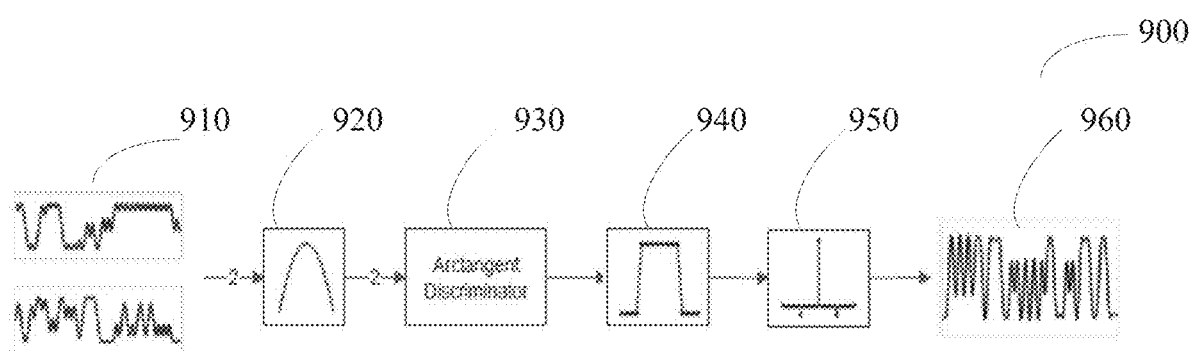
FIG. 9 is a block diagram of a limiter-discriminator (LD) based detector for GFSK demodulation.

Referring again to the drawing figures where like reference designators refer to like elements, FIG. 9 is a block diagram of a limiter-discriminator (LD) based detector 900 for GFSK demodulation. Complex, received samples 910 are inputted to a receive selectivity filter 920 which is followed by an arctangent discriminator 930, which computes the modulo-2n differential of the instantaneous, four-quadrant angle, with its output normalized by π. A post-discriminator, integrate-and-dump filter 940, which removes additional noise, is followed by a zero-forcing equalizer (ZFE) 950, which compensates for inter-symbol interference (ISI) introduced by the transmitter and post-discriminator filter. For the purpose of this disclosure, the receive selectivity filter 920 may be a Gaussian filter with two-sided, 3-dB bandwidth $0.9R_s$, where $R_s$ is the symbol rate in symbols per second, and $R_s=1/T$ where T is the nominal symbol duration. The ZFE 950 is designed such that its response, combined with the post-discriminator, integrate-and-dump filter 940 response, and the transmitted frequency pulse (t), forms a T-spaced, zero-ISI channel.

Figure 10:
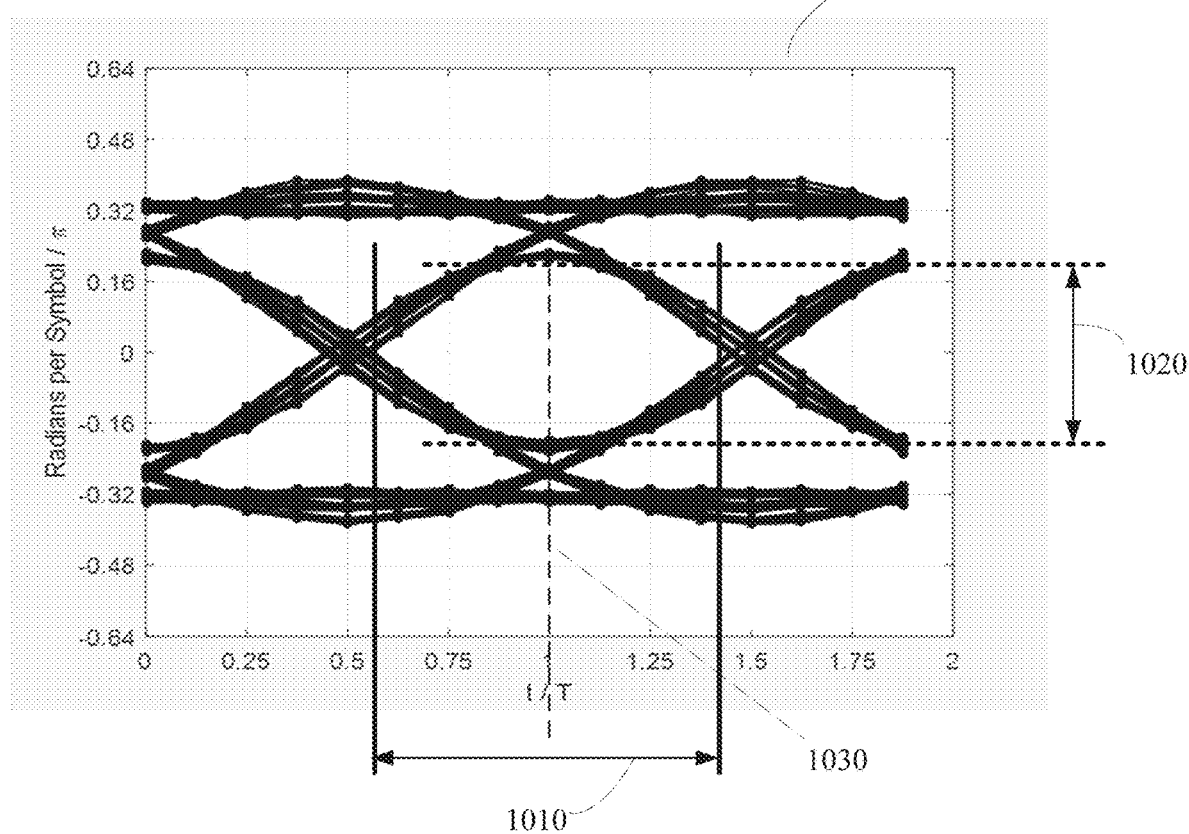
FIG. 10 is the demodulated eye diagram 1000, at high signal-to-noise ratio (SNR), for GFSK signal with nominal modulation indices h=0.32, for a system over-sampling rate of $N_s$=8 samples per symbol.

FIG. 10 is a demodulated "eye diagram" 1000, for a GFSK signal with nominal modulation index h=0.32, for a system over-sampling rate of $N_s$=8 samples per symbol. An eye diagram is a common indicator of the quality of signals in digital transmissions. There is a horizontal opening 1010 that is related to the jitter and the size of the vertical opening 1020 is related to the signal to noise ratio. The most open vertical part of the eye represents the best time to sample the waveform with the center 1030.

Figure 11:
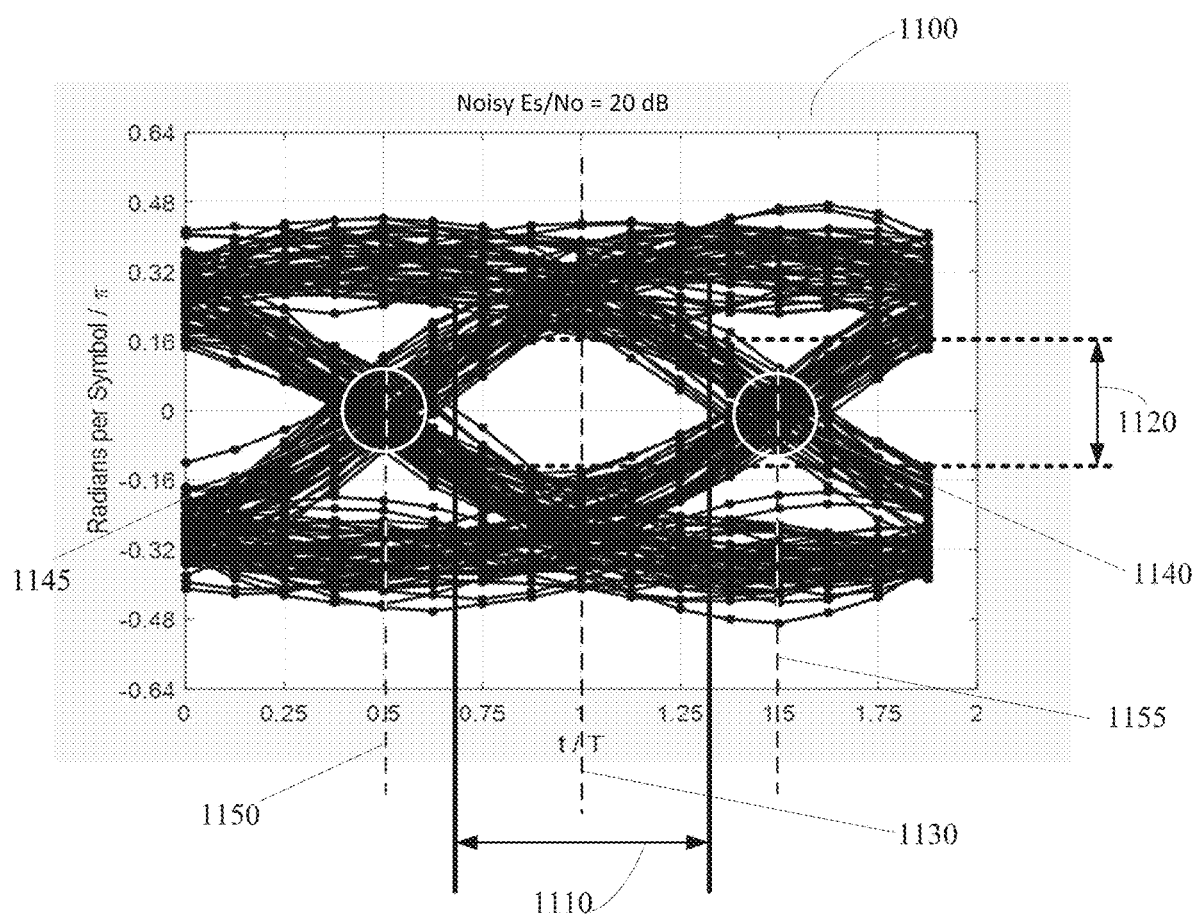
FIG. 11 is the demodulated eye diagram 1000, at low signal-to-noise ratio (SNR), for GFSK signal with nominal modulation indices h=0.32, for a system over-sampling rate of $N_s$=8 samples per symbol.

FIG. 11 is a demodulated eye diagram 1100, at low signal-to-noise ratio (SNR) as compared with the SNR for the signal of FIG. 10, for GFSK signal with nominal modulation index h=0.32, for a system over-sampling rate of $N_s$=8 samples per symbol. The eye diagram shown in FIG. 11 has a horizontal opening 1110 and the vertical opening 1120 is smaller than 1020 indicating that the signal represented in FIG. 11 has lower signal to noise ratio than the signal in FIG. 10. The center of the horizontal opening 1130 is also shown in FIG. 11. Note that there are eye crossing points 1140 and 1145 at the sampling points t/T=0.5 and 1.5, 1150 and 1155 respectively.

For blind LAP detection, synchronizing onto a random GFSK bit stream without the aid of an a priori sync word is needed. A block synchronization method is disclosed that works on the zero forcing equalizer (ZFE) 950 output of a limiter discriminator (LD) detector 900. This synchronizer is optimized in the sense that once the length-64 sync word has been received, the synchronization estimates used to demodulate the sync word bits are based on the entire, received, length-64 sync word. The solution does not require any convergence time or tracking, as it is block-based.

The sample sequence, $\{z_m\}$, at the ZFE output 950, is at a rate of $N_s$ samples per symbol. Since the arctangent discriminator 930 is normalized by π, the units at the LD output 960 are half-cycles-per-sample. The conversion to frequency, $C_{LD2Hz}$, in Hz, is therefore $$C_{LD2Hz} = \frac{N_s R_s}{2} \quad (1)$$

The maximum, expected, 1-sided, instantaneous frequency, $f_{max}$, at the ZFE output is $$f_{max} = 1.25 \cdot h_{max} \cdot \frac{R_s}{2} + f_{0,max} \quad (2)$$

where $h_{max}$ is the maximum transmitter modulation index, $f_{0,max}$ is the maximum expected 1-sided frequency offset, in Hz, and 1.25 is a factor that accounts for the end-to-end pulse shape for Gaussian frequency shift keying (GFSK). For BR, the modulation index h can vary within the range 0.28≤h≤0.35, hence $h_{max}$=0.35. For any BR transmission, the initial center frequency must be within ±75 kHz of the nominal channel frequency, and is, then, allowed to drift by as much as ±25 kHz for a single-slot packet. Hence $f_{0,max}$ has a value of 100 kHz.

A set of frequency bins is formed of length $(2N_f+1)$ to cover the range $\pm f_{max}$, hence the frequency bin spacing, $\Delta f$, is $$\Delta f = \frac{f_{max}}{N_f} \quad (3)$$

and the scalar conversion from LD output to frequency bin location, $C_{LD2bin}$, is $$C_{LD2bin} = \frac{C_{LD2Hz}}{\Delta f} = \frac{N_s R_s N_f}{1.25 h_{max} R_s + 2 f_{0,max}} \quad (4)$$

The frequency bin location for LD output $z_m$ is therefore $$k_m = \min\{\max[\text{round}(C_{LD2bin} z_m) + N_f, 0], 2N_f\} \quad (5)$$

with $k_m \in [0, 2N_f]$, where the operation round(•) implies commercial rounding.

For example, values $R_s$=1000000 symbols per second, $N_s$=8, $N_f$=10, $h_{max}$=0.35, and $f_{0,max}$=100 kHz, yield the following results:

$C_{LD2bin}$=125.4902

$f_{max}$=318750 and $\Delta f$=31875 Hz

A 2-dimensional histogram $\{H(k, n)\}$ may then be created of size $(2N_f+1) \times N_s$, which is to be accumulated over the most recent block of N symbol intervals, encompassing the prospective sync word and the last two preamble symbols, i.e., N=66. Using the same example values, the 2-dimensional histogram is of size 21×8. With $\{H(k, n)\}$ initialized to all zeros. For symbol interval i, the 2-D histogram is updated for symbol timing phases n=0, 1, . . . , $N_s$−1

$$H(k_{iN_s+n}, n) = H(k_{iN_s+n}, n) + 1 \quad (6)$$

and, for i≥N, $$H(k_{(i-N)N_s+n}, n) = H(k_{(i-N)N_s+n}, n) - 1 \quad (7)$$

By such means, the histogram will be populated with the results of the most recent block of 66 symbols, sampled at 8 samples per symbol.

Figures 12, 13:
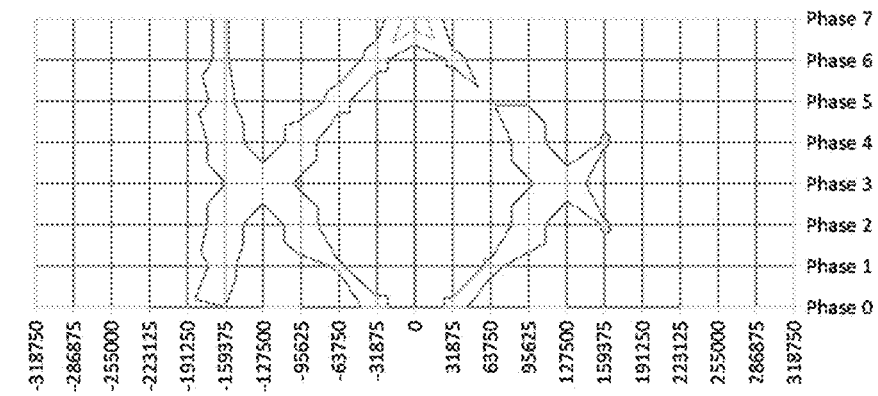
FIG. 12 is an example of a 2-dimensional histogram for good signal to noise ratio.
FIG. 13 is a wireframe contour graph corresponding to the histogram of FIG. 12.

FIG. 12 is an example of a 2-dimensional histogram formed as previously described in equations (6) and (7). Histogram 1200 contains the result of a block of 66 symbols in the matrix of Frequency bin 1210 and Phase n, where n=0 to 7, 1220. This histogram is representative of a packet that has a good signal to noise ratio and no frequency offset. The corresponding wireframe contour 1250 of the histogram shown in FIG. 13 resembles the eye diagram previously described in FIG. 10. The 'eye' 1230 can be observed as represented by zeros in the respective bins, FIG. 14 is another example of a 2-dimensional histogram. The histogram 1300 is of a packet that has good signal to noise ratio, i.e. low noise, but is offset in frequency. The corresponding wireframe contour 1350 to the histogram 1300, shown in FIG. 15, can be compared to wireframe contour 1250 and a shift of the 'eye' to the right can be clearly seen indicating a frequency offset. The range of values other than zero 1310 within the 2D Histogram 1300 are contained within the ranges of frequency bins −95625 and 255000. The 'eye' 1320 in histogram 1300 is between frequency bins 0 and 159375. The crossing points 1330 and 1335 at the center, phase 3, correspond to the variation due to the signal to noise ratio. In histogram 1300 the positive frequency shifts 1335, are between 191250 and 255500 and the negative frequency shifts, 1335, are between −31875 and −95625. In wireframe contour 1350 the effective 'eye' center 1340 is at a frequency between 63750 and 95625. The positive frequency shifts, 1350 and 1355, corresponding to 1335, are between 191250 and 255500 and the negative frequency shifts, 1360 and 1365, corresponding to 1330, are between −31875 and −95625.

Figures 16, 17:
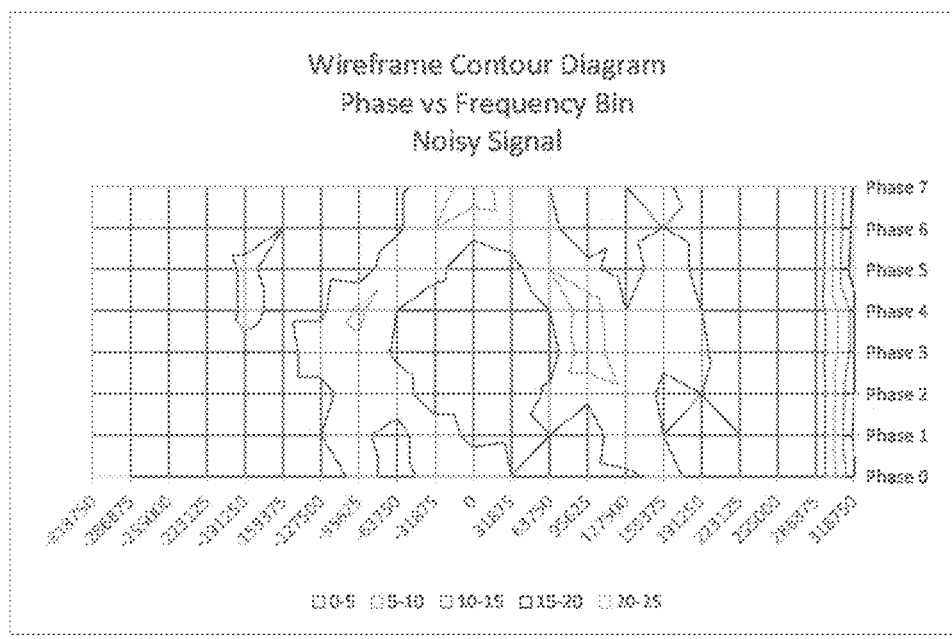
FIG. 16 is an example of a 2-dimensional histogram for poor signal to noise ratio.
FIG. 17 is a wireframe contour graph corresponding to the histogram of FIG. 16.

FIG. 16 is yet another an example of a 2-dimensional histogram. The histogram 1400 is of a packet that has poor signal to noise ratio. The histogram 1400 and the corresponding wireframe contour 1450 shown in FIG. 17, do both show the presence of an 'eye' and hence indicative that a Bluetooth® packet has been received, albeit at a poor signal to noise ratio.

Figures 18, 19:
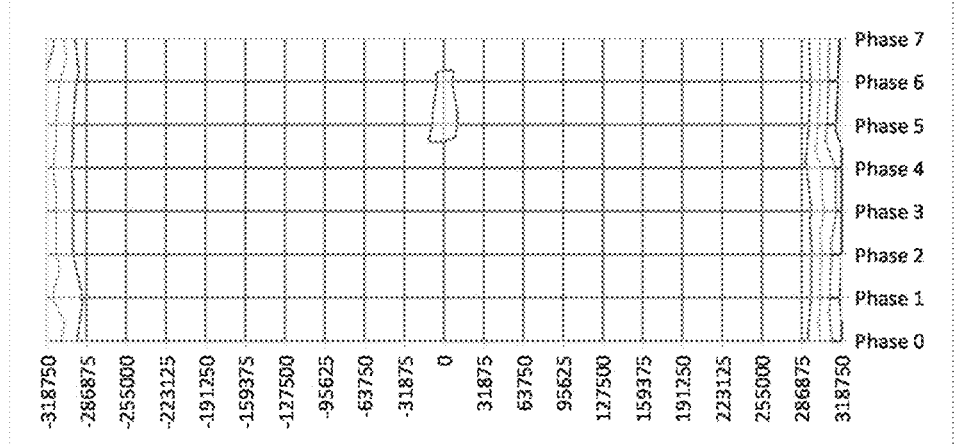
FIG. 18 is an example of a 2-dimensional histogram for noise.
FIG. 19 is a wireframe contour graph corresponding to the histogram of FIG. 18.

FIG. 18 is an example of a 2-dimensional histogram 1500 that is the result of pure noise, i.e. no detected packet. The absence of an 'eye' in both histogram 1500 and the corresponding wireframe contour diagram 1550, shown in FIG. 19 is indicative that a Bluetooth® packet has not been received.

Having created a 2-dimensional histogram, as per example FIGS. 12A, 13A and 14A, the histogram may then be analyzed on a symbol interval basis to estimate symbol timing phase, frequency offset and DC offset for the most recent block of received symbols.

Returning to FIG. 12, the zeros in a well-defined eye represent a Bluetooth® packet with good signal to noise ratio and no offset frequency. The 'eye' 1230 is symmetrical and centered at Phase 3, Frequency bin 0. Note that outside the frequency bins −191250 to 191250, 1240, there are no level crossings recorded. Note also that the 'eye' column for Phase 7 has 28 zeros at the center Frequency bin 0. Based upon these observations, designed in accordance with the prescribed frequency-bin configuration, the following symbol-matching template, $\vec{w}$; is defined as:

$$\vec{w}=[1\ 1\ 1\ 1\ 0\ 0\ 0\ 0\ 0\ 1\ 1\ 1\ 1]$$

After accumulating the histogram for symbol timing phases n=0, 1, . . . , $N_s$−1 of symbol interval i, the symbol-template correlation is computed $$C_{k,n} = \sum_{p=1}^{4} H(k + N_f + 2 + p, n) + \sum_{p=1}^{4} H(k + N_f - 2 - p, n) \quad (8)$$

for $k \in [-k_{max}, k_{max}]$, where $$k_{max} = \left\lceil \frac{f_{0,max}}{\Delta f} \right\rceil \quad (9)$$

with $k_{max}$=4 for the prescribed configuration.

In order to choose the center of the demodulated eye, the template correlations are augmented with the number of level-crossings which occur one-half symbol away, i.e.

$$C_{k,n}=C_{k,n}+H((k+N_f),(n+N_s/2) \bmod N_s) \quad (10)$$

The symbol timing phase, $\hat{n}_i$ for symbol interval i, is then estimated according to $$\hat{n}_i=\mathrm{argmax}_{n\in[0,N_s-1]}[\max_k(C_{k,n})] \quad (11)$$

The DC offset, $\widehat{DC}_i$ at the LD output may be estimated according to $$k_0 = \mathrm{argmax}_{k\in[-k_{max},k_{max}]}(C_{k,\hat{n}_i}) \quad (12)$$

$$k_f = \begin{cases} k_{max} & k_0 = k_{max} \\ k_0 + \dfrac{C_{k_0-1,\hat{n}_i} - C_{k_0+1,\hat{n}_i}}{2\left(C_{k_0-1,\hat{n}_i} + C_{k_0+1,\hat{n}_i} - 2C_{k_0,\hat{n}_i}\right)} & \text{else} \\ -k_{max} & k_0 = -k_{max} \end{cases} \quad (13)$$

$$\widehat{DC}_i = \frac{k_f}{C_{LD2bin}} \quad (14)$$

with the corresponding frequency offset estimate, $\hat{f}_i$, in Hz $$\hat{f}_i=C_{LD2Hz}\cdot\widehat{DC}_i \quad (15)$$

Figure 20:
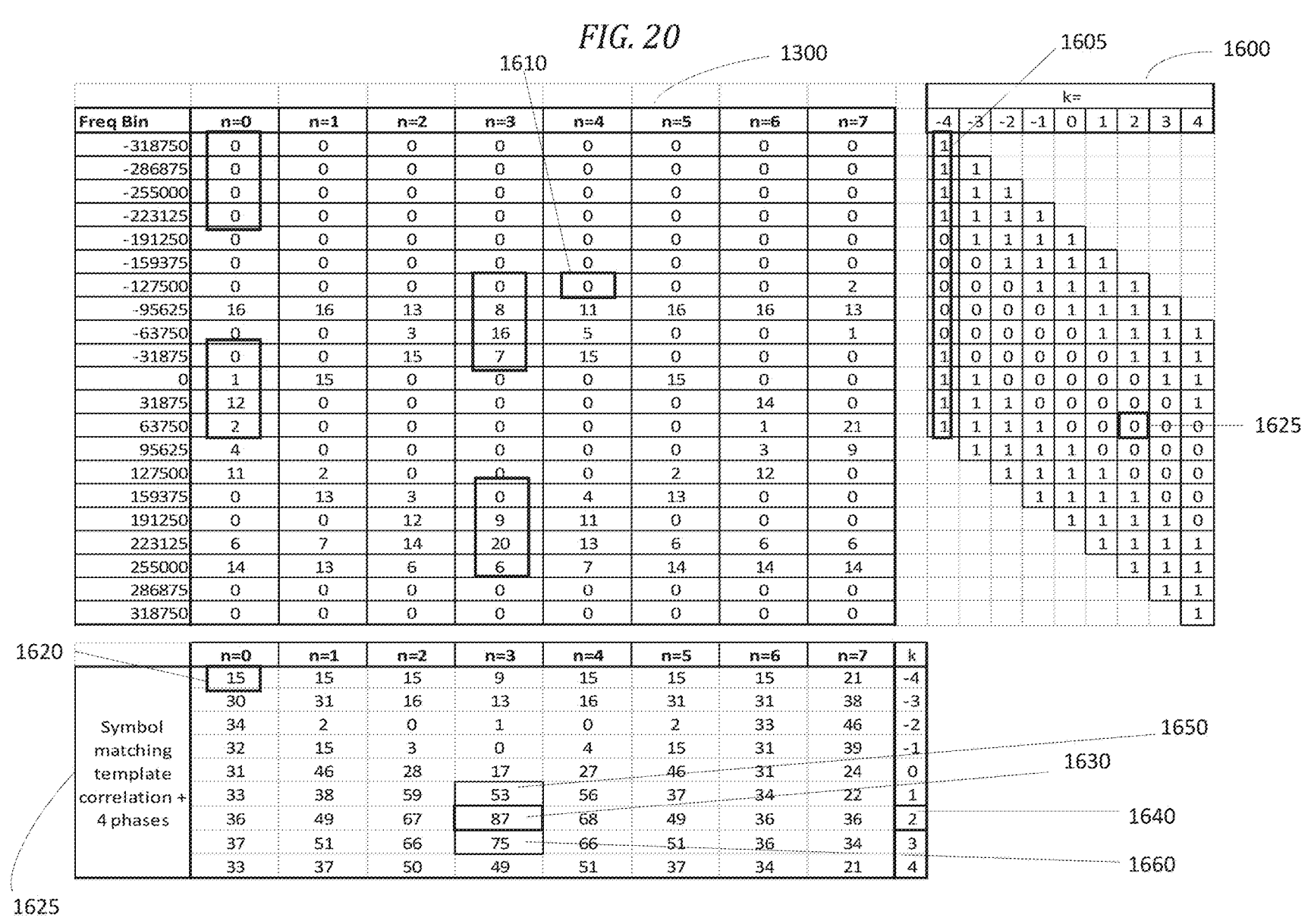

A more complete understanding of the present embodiments, and the attendant advantages and features thereof, will be more readily understood by reference to an example using equations (8) to (15). FIG. 20 is an example of the procedure based upon histogram 1300. The template 1600 is that used in equation (8). The results shown in table 1625 for n=0 to 7 and k=−4 to +4 are calculated by application of equations (8) and (10). For example, the value for $C_{-4,0}$, (where n=0 and k=−4), 1620 is calculated by first applying equation (8) using the template mask for k=−4, 1605.

From equation (8)

$C_{-4,0}=(0+0+0+0)+(0+1+12+2)=15$

Applying equation (10)

$C_{-4,0}=15+H[(k+Nf), (n+Ns/2)]$ $C_{-4,0}=15+H(6,4)]$

From histogram 1300, H (6, 4)], 1610, has a value of 0. Therefore $C_{-4,0}$, 1620, has a value of 15.

Application of equation (11) results in the maximum value in table 1625. The maximum value, $\hat{n}_i$, is $C_{2,3}$, (k=2, n=3), 1630, and has a value of 87.

Application of equation (12) returns the value, $k_0$, of k corresponding to $\hat{n}_i$, which is 2, 1640.

Equation (13) is an interpolation between the frequency bins in order to estimate the frequency offset. $C_{k_0-1,\hat{n}_i}$, 1650 has a value of 53, $C_{k_o+1,\hat{n}_i}$, 1660, has a value of 75. Setting these values into equation (13) results in a value for $k_f$:

$$k_f=2+[(53-75)/(2*((53+75-2*87))]=2.239$$

Equation (14) then yields a value for $$\widehat{DC}_i = \frac{2.239}{125.4902} = 0.01784,$$

And application of equation (15) results in the estimated frequency offset, $$\hat{f}_i=0.01784*400000=71372 \text{ Hz}$$

Referring to the lower graph of FIG. 13, the estimated center frequency 1340 is therefore at 71372 Hz.

Hence, if a Bluetooth packet is present, then the application of equations (8) to (15) to the histogram derived from the latest 66 symbol periods will extract the frequency offset estimation and the corresponding center DC offset.

The estimated sample time $\hat{m}_{0,i}$ associated with the center of the first sync word symbol is $$\hat{m}_{0,i}=\hat{n}_i+(i-63)N_s \quad (16)$$

To prevent/mitigate errors introduced by symbol-slip and symbol-repeat, the following rule is then enforced for $i \geq N-1$ $$\hat{m}_{0,i} = \begin{cases} \hat{m}_{0,i} - N_s & \Delta_t \geq 1.75N_s \\ \hat{m}_{0,i} + N_s & \Delta_t \leq 0.25N_s \\ \hat{m}_{0,i} & \text{else} \end{cases} \text{ Where } \Delta_t = \hat{m}_{0,i} - \hat{m}_{0,i-1} \quad (17)$$

For example, further to the example above where $\hat{n}_i=87$, assume that $i=73$. If there is no slippage or repeat:

Then, from equation (16)

$$\hat{m}_{0,i}=\hat{n}_i+(i-63)N_s=87+(73-63).8=167$$

And $$\hat{m}_{0,i-1}=\hat{n}_i+(i-63)N_s=87+(72-63).8=159$$

Hence, from equation (17)

$$\Delta_t=\hat{m}_{0,i}-\hat{m}_{0,i-1}=167-159=8=N_s$$

If there is no symbol slip or symbol repeat then $\Delta_t$ will always be equal to a value close to $N_s$. Thus, referring to equation (16), $\Delta_t \geq 1.75N_s$ represents the case where a symbol is missed and $\Delta_t \leq 0.25N_s$ the case where there is a symbol repeated.

The sample sequence, $\{z_m\}$, at the ZFE output 950, is at a rate of $N_s$ samples per symbol and the length-64 demodulated bit vector, $\vec{b}_i$, for symbol interval i is $$\vec{b}_i=[b_{i,0}\ b_{i,1}\ b_{i,2}\ \ldots\ b_{i,63}] \quad (18)$$

Where, for n=0, 1, 2, . . . , 63, $$b_{i,n} = \begin{cases} 1 & z_{\hat{m}_{0,i}+nN_s} \geq \widehat{DC}_i \\ 0 & z_{\hat{m}_{0,i}+nN_s} < \widehat{DC}_i \end{cases} \quad (19)$$

Hence, at every symbol interval i, the last 64 demodulated bits are outputted.

Figure 21:
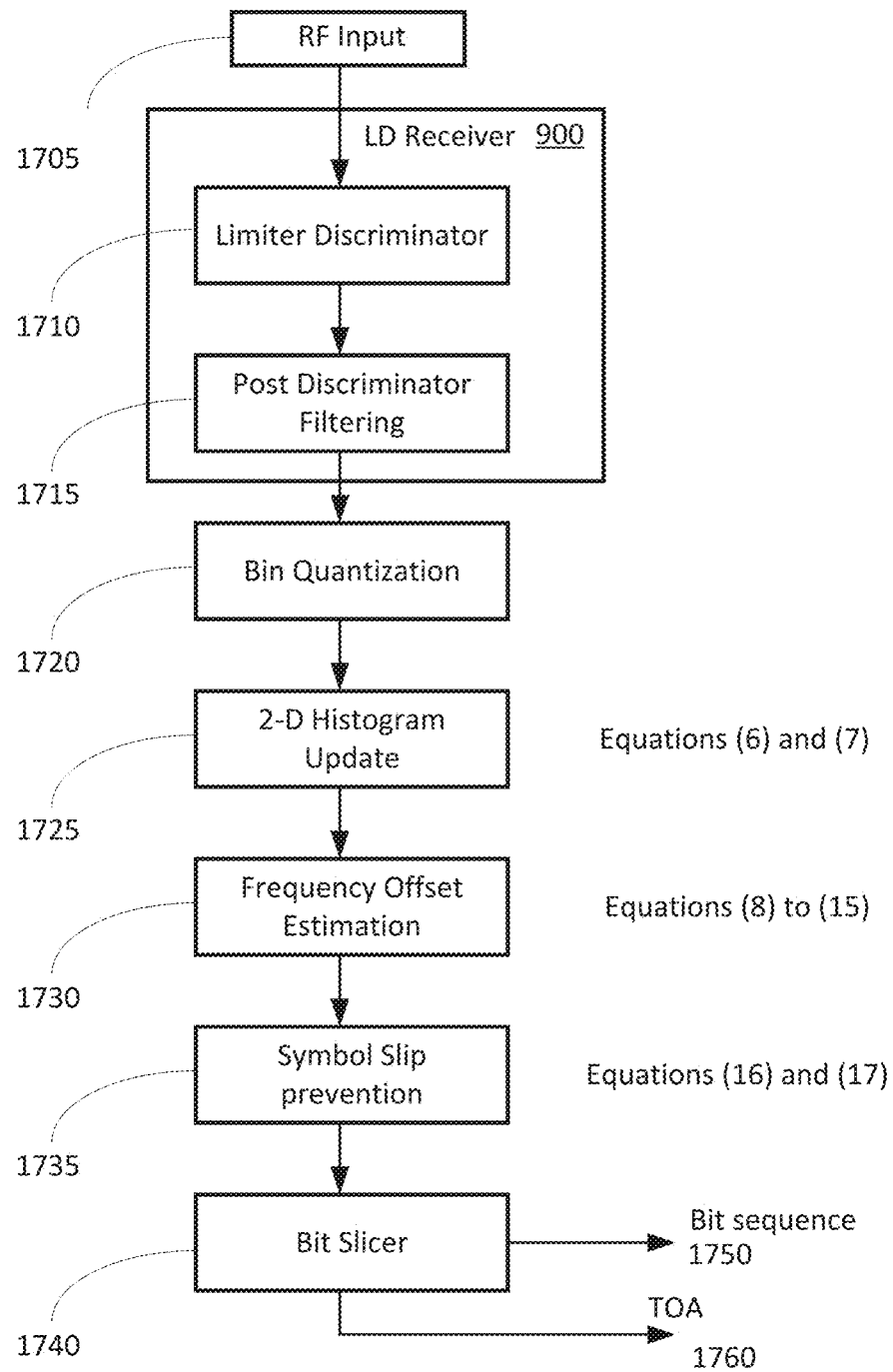
FIG. 21 is a diagram showing the sequence of steps that cover the actions of the blind demodulator.

FIG. 21 is a diagram showing an example of a sequence of steps that cover the actions of the blind demodulator described above. The RF input, 1705, is inputted to the LD receiver, 900, where the processes of the limiter discriminator, 1705, and post discriminator filtering, 1715, are performed as described in FIG. 9 and covered by blocks 920 to 950. The output of the post discriminator filtering, step 1715, may be followed by bin quantization step 1720. In the bin quantization step, 1720, the output of the post discriminator filter is rounded to the closest frequency bin and the result may be used to update the 2-D histogram in step 1725. Equations (6) and (7) describe this updating process producing a histogram {H(k, n)} examples of which are shown in FIGS. 12, 13 and 14. For each symbol interval i, the 2-D histogram update, 1725, may be followed by an estimation of the DC and frequency offset, step 1730, as described in equations (8) to (15). Step 1730 may be followed by step 1735, symbol slip prevention where instances of missing or repeat symbols are detected and compensated for, as described in equations (16) and (17). Step 1735 may be followed by step 1740 where the bit slicer process is carried out as described in equations (18) and (19) producing the resulting bit sequence, 1750 and the corresponding time of arrival, 1760, for the first bit symbol of the set of 64 that comprises the possible sync word.

A blind synchronizer as described above processes a received signal and outputs a stream of length 64 binary vectors, $b_1$. Each prospective block of 64 bits may then be checked for resemblance to a Classic Bluetooth sync word. For example, from each length-64 block, the 24-bit field corresponding to the prospective LAP can be extracted, and then a sync word re-encoding into 64 bits can be performed. In general, if the received 64 bits match the re-encoded 64 bits to within a distance of t bit errors, an LAP is detected, and packet processing may ensue.

Figure 22:
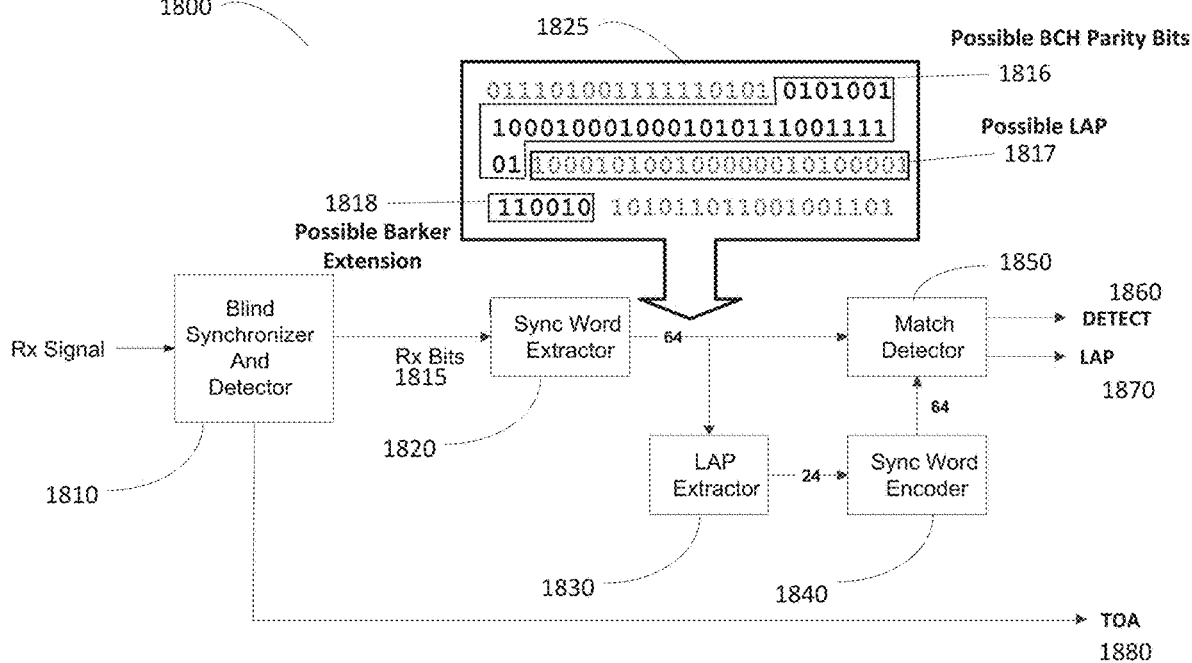
FIG. 22 is a block schematic diagram of one embodiment according to principles set forth herein.
Figure 23:
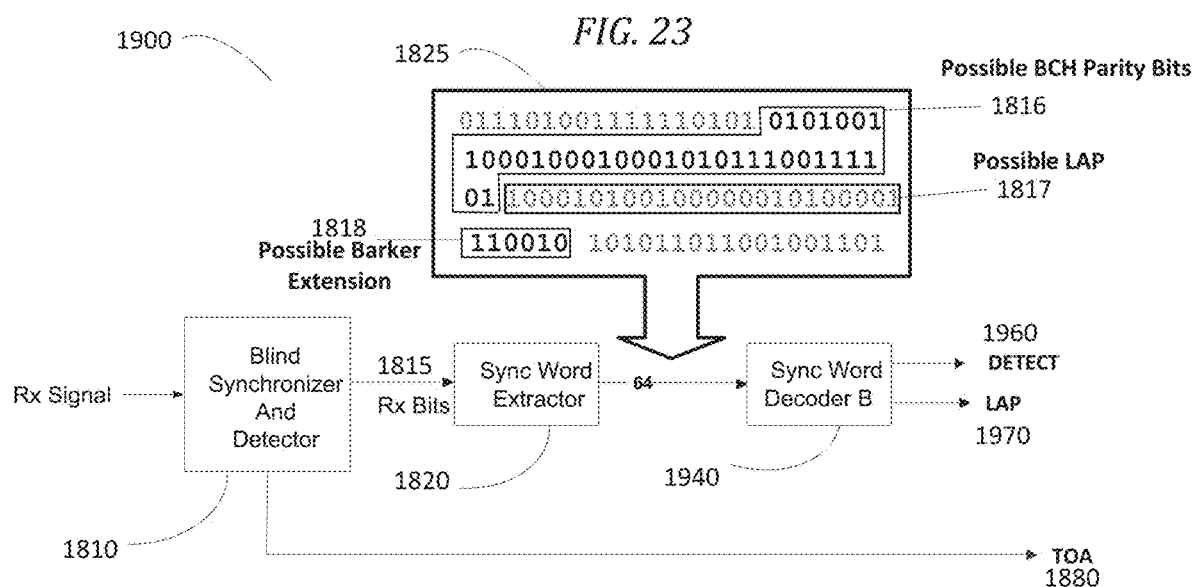
FIG. 23 is a block schematic diagram of another embodiment according to principles set forth herein.
Figure 24:
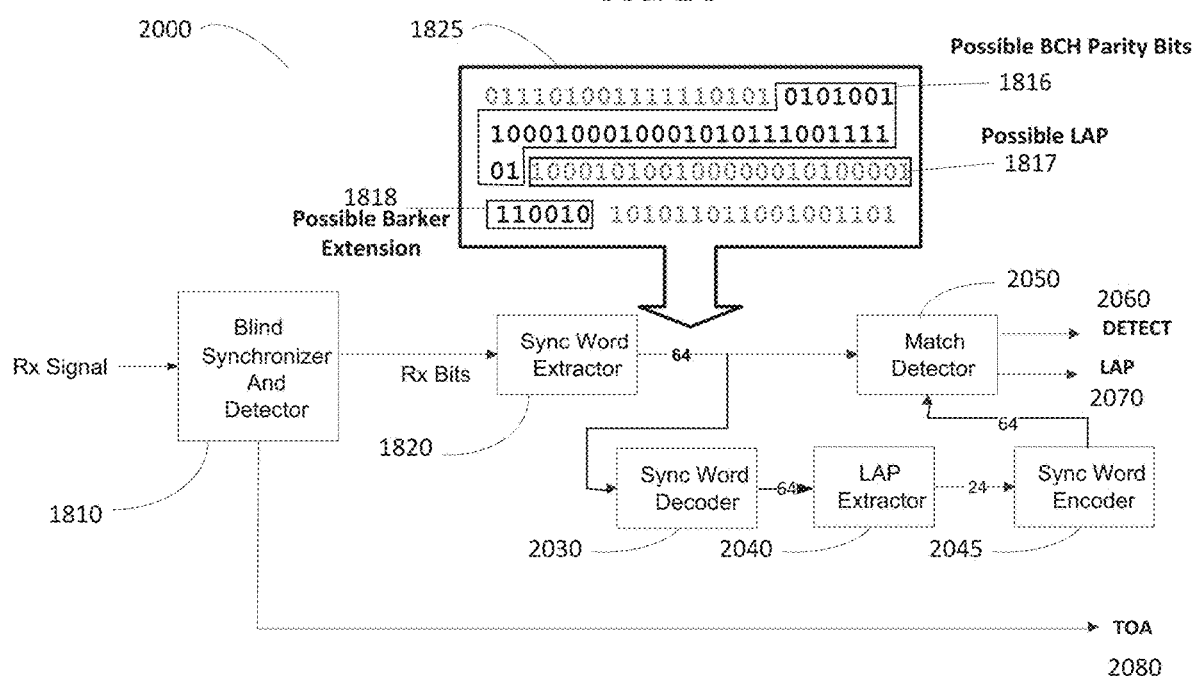
FIG. 24 is a block diagram of yet another embodiment of the invention.

FIGS. 22, 23 and 24 are examples of different embodiments for blind LAP detection schemes which employ sync word re-encoding, whereby each prospective block of 64 bits is checked to see if it resembles a Classic Bluetooth sync word, with an error allowance of t errors.

FIG. 22 is a block schematic diagram 1800 of one embodiment where the blind synchronizer and detector, 1810, outputs a stream of bits, 1815, and the Sync Word Extractor block 1820 extracts the length-64 binary vectors, 1825. The 64-bit output 1825 from the Sync Word Extractor 1820 is applied to the Match Detector 1850 and to the LAP Extractor block 1830. From each length-64 block, the 24-bit field corresponding to the prospective LAP, is extracted in the LAP extractor block 1820 and inputted to the Sync Word Encoder 1840, which performs sync word re-encoding into 64 bits as previously described in FIG. 5. The re-encoded sync word is then applied to the Match Detector 1850 where it is compared to the 64 bits 1825 from the Sync Word Extractor 1820. If the re-encoded 64 bits from the Sync Word Encoder 1840, match the 64-bit block from the Sync Word Extractor 1820, within a distance of t bit errors, an LAP 1870 is outputted and a detected packet 1860 is declared, thus permitting subsequent packet processing to ensue.

FIG. 23 is a block schematic diagram 1900 of another embodiment of the invention where, like FIG. 22, the blind synchronizer and detector, 1810, outputs a stream of bits, 1815, and the Sync Word Extractor block 1820 extracts the length-64 binary vectors, 1825. As described in FIG. 5 the length-64 binary vectors, 1825 will include the possible BCH parity bits 1816, the possible LAP 1817, and the possible Barker code 1818. The length-64 binary vectors, 1825 are inputted to a Sync Word Decoder B, 1940 which attempts to decode the descrambled 64 bits to the closest (64,30) codeword 545, and considers a packet to be detected whenever the decoder discerns a suitable codeword. An LAP 1870 is then outputted and a detected packet 1960 is declared, thus permitting subsequent packet processing to ensue.

FIG. 24 is a block schematic diagram 1900 of yet another embodiment of the invention where, similar to FIGS. 22 and 23, the blind synchronizer and detector, 1810, outputs a stream of bits, 1815, and the Sync Word Extractor block 1820 extracts the length-64 binary vectors, 1825, which is inputted to the Match Detector 2050 and the Sync Word Decoder 2030. The Sync Word Decoder 2030 decodes the closest (64,30) codeword 545 and then the LAP portion of the closest, decoded (64,30) codeword is extracted in the LAP Extractor 2040. The extracted LAP is then re-encoded into a length-64 sync word in the Sync Word Encoder 2045 and compared to the demodulated 64 bits in the Match Detector 2050 looking for a match within a distance of t bit errors. An LAP 2070 is then outputted and a detected packet 2060 is declared, thus permitting subsequent packet processing to ensue.

The "Re-Encode" method as per FIG. 22 does not require any BCH decoding, but it may require that all 24 bits of the received LAP be free of error. The second "Decode" method as per FIG. 23 accepts any codeword that passes BCH decoding and is therefore prone to false detection. The third method "Decode/Re-Encode" method as per FIG. 24 controls false detection but may require BCH decoding hardware.

It is of interest to determine the probability of these three methods falsely detecting an LAP, when receiving noise only. Consider that there are $2^{24}$ possible sync words, $2^{30}$ possible (64,30) codewords, and $2^{64}$ possible 64-tuples sync words. For the re-encode method, as per FIG. 18, the number of possible 64-tuples within distance d of a given sync word, excluding the possibility of error in the LAP portion, is $$\binom{40}{d}$$

For either the decode or decode/re-encode method, as per FIGS. 23 and 24, the number of possible 64-tuples within distance d of a given codeword is $$\binom{64}{d}$$

Therefore, for a randomly received n-tuple, the probability of false LAP detection, $P_f$, when allowing up to t bit errors, is $$P_f = 2^{k-64} \sum_{d=0}^{t} \binom{n}{d} \quad (20)$$

where k=24 when re-encoding as per FIG. 22 and FIG. 24, and k=30 for the decode-only method as per FIG. 23, and n=40 for the re-encode—only method, as per FIG. 22. The probability of false detection $P_b$, over a block of $N_b$ channel symbols is $$P_b = 1 - (1 - P_f)^{N_b} \quad (21)$$

Figures 25, 26:
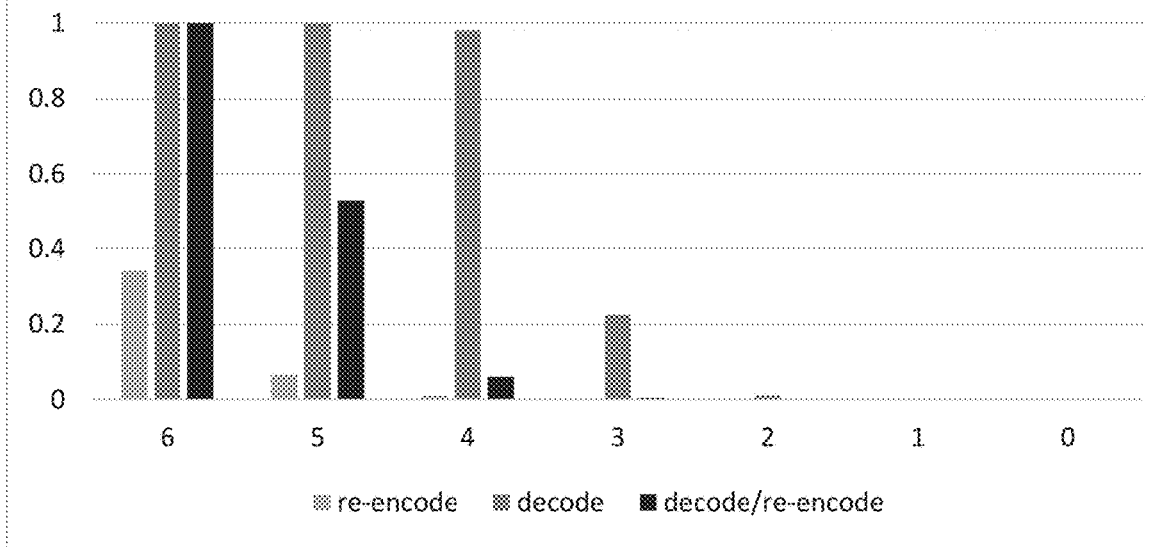
FIG. 25 is a table that summarizes the probability of false LAP detection for all three methods, "re-encode" as per FIG. 22, "decode", as per FIG. 23, and "decode/re-encode" as per FIG. 24.
FIG. 26 is a corresponding graphical representation of the results in the table of FIG. 25.

FIGS. 25 and 26 summarize the probability of false LAP detection for all three methods, "re-encode" as per FIG. 22, "decode", as per FIG. 23, and "decode/re-encode" as per FIG. 24. Table 2100 summarizes the probability of false LAP detection for all three methods, "re-encode" as per FIG. 22, "decode", as per FIG. 23, and "decode/re-encode" as per FIG. 24. The probability of false detection, $P_b$, is calculated for the number of allowable errors, t, over a 100 msec search window ($N_b=10^5$). Graph 2150 is the corresponding graphical representation of the results in Table 2100. Comparing the results, the re-encode method as depicted in FIG. 22 may be preferred, in terms of strictly false detection performance. However, the decode/re-encode method of FIG. 24 could potentially provide a significant advantage in terms of detection sensitivity, while still controlling false detection performance to within acceptable levels.

Figure 27:
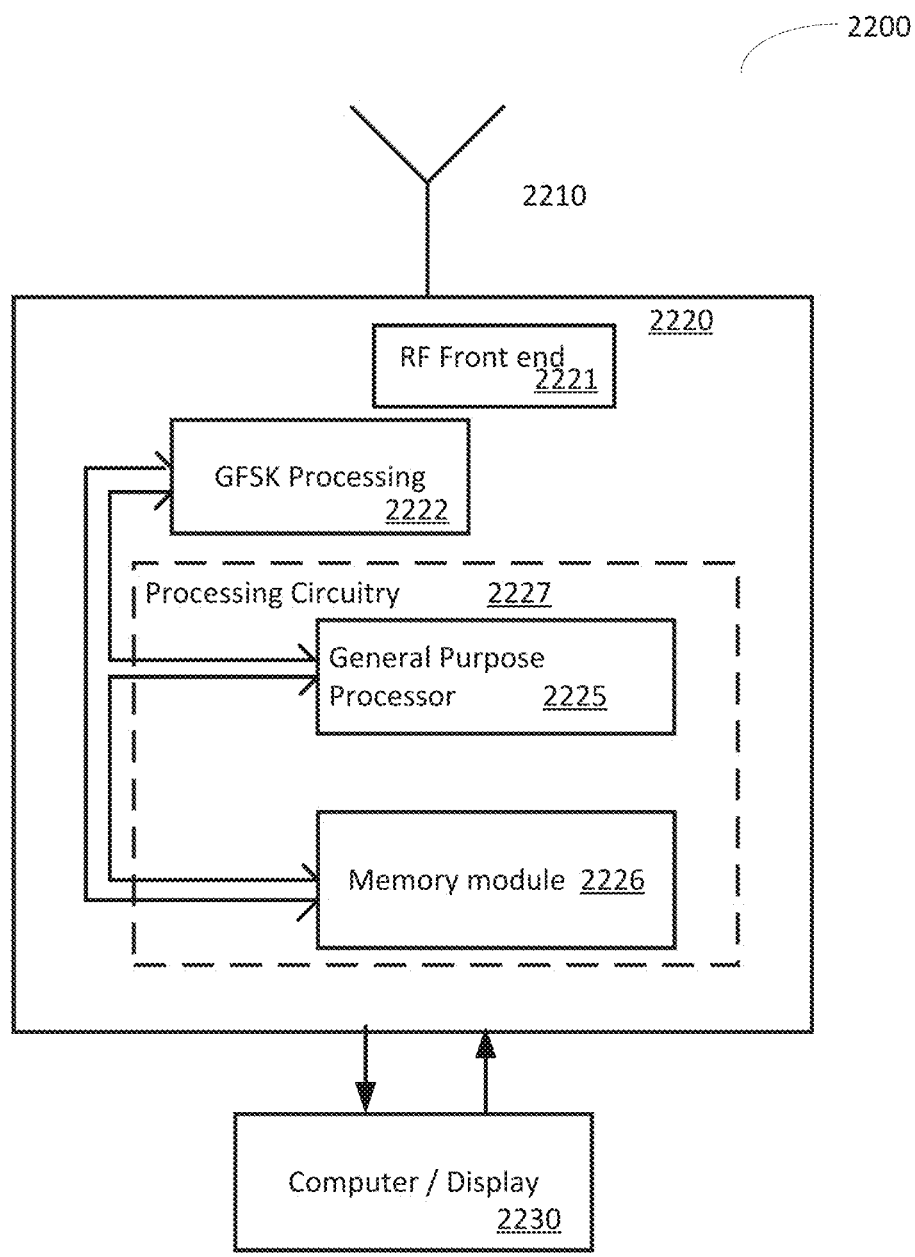
FIG. 27 is an example of a wireless receiver system according to an embodiment of the disclosure that may be used as a blind Bluetooth packet receiver detector.

FIG. 27 illustrates a wireless receiver 2200 according to an embodiment of the disclosure that may be used as the blind Bluetooth packet receiver detector. Wireless receiver 2200 includes a wireless receiver 2220, and an antenna 2210 which is tuned to receive the Bluetooth® packets.

The wireless receiver 2220 include an RF front end 2221 and a GFSK Processing block 2222. The wireless receiver 2220 may perform the usual functions of an RF receiver front end such as low noise amplification, filtering and frequency down conversion to condition the received signal suitable for the processing in the GFSK Processing block 2222. The GFSK Processing block 2222 may include an LD discriminator 900 as described in FIG. 9 and may perform the processes as described in equations (1) to (7). The GFSK Processing block 2222 may be a processor with separate software stored in a memory such as the memory module 2226, or may be a processor with embedded software such as an FPGA, ASIC, etc. In some embodiments, the GFSK Processing block 2222 may be software that is executed by the processing circuitry 2227. In some embodiments, the GFSK Processing block 2222 may be implemented by or as a part of processing circuitry 2227. The wireless receiver 2220 may also include a general purpose processor 2225, and memory module 2226 which together form processing circuitry 2227 that may be configured to perform the processing procedures of this disclosure, for example as described in FIG. 17 steps 1720 to 1740 as well as elsewhere herein, The processing circuitry 2227 may be configured to control any of the methods and/or processes described herein and/or to cause such methods, and/or processes to be performed, e.g., by the wireless receiver 2220. Processor 2225 corresponds to one or more processors 2225 for performing the wireless receiver 2220 functions described herein. The memory module 2226 is configured to store data, programmatic software code and/or other information described herein. In some embodiments, the software may include instructions that, when executed by the processor 2225 and/or processing circuitry 2227, causes the processor 2225 and/or processing circuitry 2227 to perform the processes described herein with respect to the wireless receiver 2220.

In addition to or instead of a processor such, as a central processing unit, and memory, the processing circuitry 2227 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. The processor 2225 may be configured to access (e.g., write to and/or read from) the memory module 2226, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

According to an embodiment of the disclosure, a computer/display 2230 may be connected to the wireless receiver 2220. The computer/display 2230 may be a computer system with an associated display module such as a laptop or tablet computer or may be a computer system with a separate display monitor. The computer/display 2230 may be used as an operator interface to the wireless receiver 2220 and to display the results of the Bluetooth® blind detection. The calculations described in this disclosure may be performed using software on the processor 2225 and memory module 2226 combination or, indeed on the computer/display 2230. In some embodiments described herein, the term "coupled," "connected," and the like, may be used herein to indicate a connection, although not necessarily directly, and may include wired and/or wireless connections.

Figure 28:
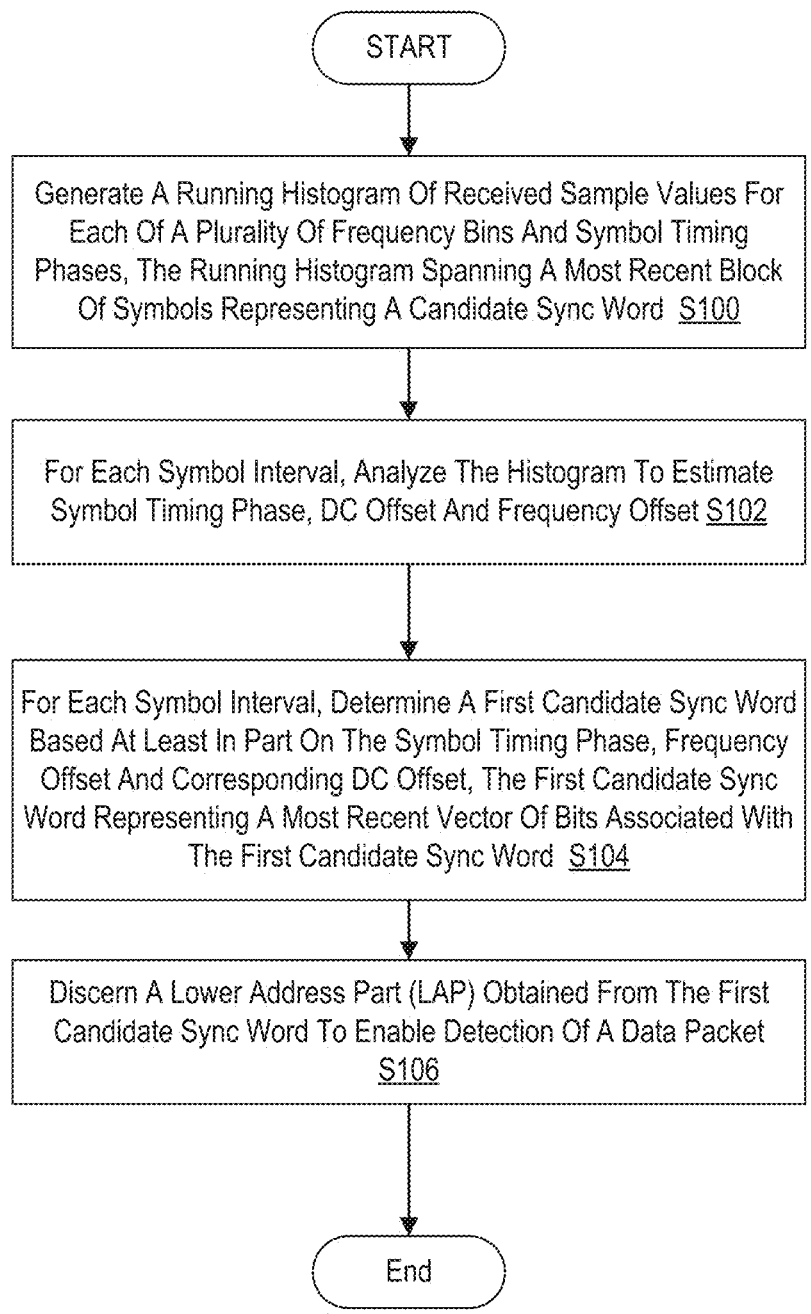
FIG. 28 is a flowchart of an exemplary process in a receiver configured for blind detection of received packets.

FIG. 28 is a flowchart of an exemplary process in a receiver configured for blind detection of received packets. The exemplary process can be executed by the general purpose processor 2225 and/or by other processing circuitry 2227. The process includes generating a running histogram of received sample values for each of a plurality of frequency bins and symbol timing phases, the running histogram spanning a most recent block of symbols representing a candidate synchronization (sync) word (Block S100). The process further includes, for each symbol interval, analyzing the histogram to estimate symbol timing phase, DC offset and frequency offset (Block S102). The process also includes determining a first candidate sync word based at least in part on the symbol timing phase, frequency offset and corresponding DC offset, the first candidate sync word representing a most recent vector of bits associated with the first candidate sync word (Block S104). The process further includes discerning a lower address part (LAP) obtained from the first candidate sync word to enable detection of the data packet (Block S106).

According to this aspect, in some embodiments, the first candidate sync word is 64 bits of which 24 bits form the LAP. In some embodiments, the method further includes estimating a sample time associated with a center of the first candidate sync word. In some embodiments, the estimated sample time is constrained to mitigate errors introduced by symbol slip and symbol repeat. In some embodiments, the symbol timing phase, frequency offset and DC offset are estimated based at least in part on a symbol-template correlation function. In some embodiments, the symbol-template correlation function is based at least in part on a summation of bin-count values of the histogram along a frequency axis of the histogram. In some embodiments, the decoding of the LAP comprises, for each symbol interval: extracting the LAP from the first candidate sync word; re-encoding the LAP to generate a second candidate sync word; comparing the second candidate sync word to the first candidate sync word; and when the second candidate sync word matches the first candidate sync word to within a predetermined number of bit errors, outputting the LAP and declaring a detected packet. In some embodiments, the decoding of the LAP comprises, for each symbol interval: decoding the first candidate sync word to a closest matching code word to produce a second candidate sync word; finding a valid codeword based on the first and second candidate sync words; and when a valid codeword is found, outputting an LAP and declaring a detected packet. In some embodiments, the decoding of the LAP comprises: decoding the first candidate sync word to a closest matching code word; extracting the LAP from an LAP portion of the closest matching code word to produce a second candidate sync word, and re-encoding the extracted LAP; comparing the second candidate sync word to the first candidate sync word; and when the second candidate sync word matches the first candidate sync word to within a predetermined number of bit errors, outputting the LAP and declaring a detected packet. In some embodiments, the histogram is of size $(2N_f+1) \times N_s$, where $N_f$ is a number of frequency bins in the histogram and $N_s$ is a number of samples per symbol.

According to another aspect, a receiver 2220 configured for blind detection of received data packets is provided. The receiver 2220 includes processing circuitry 2227 configured to: generate a running histogram of received sample values for each of a plurality of frequency bins and symbol timing phases, the running histogram spanning a most recent block of symbols representing a candidate synchronization (sync) word. For each symbol interval, the processing circuitry 2227 is configured to analyze the histogram to estimate symbol timing phase, DC offset and frequency offset. Also for each symbol interval, the processing circuitry is further configured to determine a first candidate sync word based at least in part on the symbol timing phase, frequency offset and corresponding DC offset, the first candidate sync word representing a most recent vector of bits associated with the first candidate sync word. The processing circuitry 2227 is further configured to discern a lower address part (LAP) obtained from the first sync candidate word to enable detection of a data packet.

According to this aspect, in some embodiments, the first candidate sync word is 64 bits of which 24 bits form the LAP. In some embodiments, the processing circuitry 2227 is further configured to estimate a sample time associated with a center of the first candidate sync word. In some embodiments, the. In some embodiments, the symbol timing phase, frequency offset and DC offset are estimated based at least in part on a symbol-template correlation function. In some embodiments, the symbol-template correlation function is based at least in part on a summation of bit-count values of the histogram along a frequency axis of the histogram. In some embodiments, the decoding of the LAP comprises, for each symbol interval: extracting the LAP from the first candidate sync word; re-encoding the LAP to generate a second candidate sync word; comparing the second candidate sync word to the first candidate sync word; and when the second candidate sync word matches the first candidate sync word to within a predetermined number of bit errors, outputting the LAP and declaring a detected packet. In some embodiments, the decoding of the LAP comprises, for each symbol interval: decoding the first candidate sync word to a closest matching sync word; finding a valid codeword based on the first and second candidate sync words, and when a valid codeword is found, outputting an LAP and declaring a detected packet. In some embodiments, the decoding of the LAP comprises, for each symbol interval: decoding the first candidate sync word to a closest matching code word; extracting the LAP from an LAP portion of the closest matching code word to produce a second candidate sync word, and re-encoding the extracted LAP; comparing the second candidate sync word to the first candidate sync word; and when the second candidate sync word matches the first candidate sync word to within a predetermined number of bit errors, outputting the LAP and declaring a detected packet.

According to yet another aspect, a method for blind detection of data packets received by a Bluetooth® receiver. The method includes generating a running histogram of received sample values for each of a plurality of frequency bins and symbol timing phases, the running histogram spanning a most recent block of symbols representing a candidate sync word. The method also includes, for each symbol interval, analyzing the histogram to estimate symbol timing phase, DC offset and frequency offset, and determining a first candidate sync word based at least in part on the symbol timing phase, frequency offset and corresponding DC offset, the first candidate sync word having 64 bits of which 24 bits form a lower address part, LAP; and discerning the LAP obtained from the first candidate sync word to enable detection of the Bluetooth® packet.

According to yet another aspect, a method for blind detection of data packets received by a Bluetooth® receiver is provided. The method includes generating a histogram of received sample values for each of a plurality of frequency bins and symbol timing phases; analyzing the histogram to determine, for a given symbol interval, the symbol timing phase, frequency offset, and DC offset, to detect synchronization with an LAP and, upon detection, to deliver the 64-bit Sync Word, which includes the LAP, along with the time-of-arrival and frequency offset estimates.

Some embodiments are described herein with reference to flowchart illustrations. It will be understood that each block of the flowchart illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart step or steps.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart step or steps.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart step or steps.

It is to be understood that the functions/acts noted in the steps may occur out of the order noted in the operational illustrations. For example, two steps shown in succession may in fact be executed concurrently or substantially concurrently, or the steps may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the specifics of the limiter discriminator design, the parameters of the 2-D histogram such as the number of frequency bins and sampling rate, the symbol matching template and the method to establish the center of the 'eye' and the frequency offset estimation, the details of the compensation for symbol slip or repeat, the order of decoding and encoding the detected bit stream to find the best match for the LAP. Accordingly, the scope should be determined not by the embodiments illustrated.

It will be appreciated by persons skilled in the art that the present embodiments are not limited to what has been particularly shown and described herein above. A variety of modifications and variations are possible in light of the above teachings without departing from the scope of the following claims.

What is claimed is:

1. A method for blind detection of a lower address part (LAP) of data packets received by a receiver, the method comprising:
   extracting binary vectors from a received signal;
   for each binary vector:
      extracting a synchronization (sync) word from the binary vector;
      determining a lower address part (LAP) based on the sync word; and
      when the sync word satisfies at least one predetermined criterion, outputting the LAP and declaring a detected packet.

2. The method of claim 1, further comprising:
   encoding a first candidate sync word, the encoded sync word being based on the LAP; and
   comparing the encoded sync word to the first candidate sync word, the at least one predetermined criterion being a match between the encoded sync word and the extracted sync word within a distance of a specified number of bit errors, t.

3. The method of claim 2, wherein the first candidate sync word is based at least in part on at least one of a symbol timing phase, a DC offset, and a frequency offset.

4. The method of claim 1, further comprising:
   decoding the extracted sync word to a closest discernible codeword, the at least one predetermined criterion being discernment of the codeword.

5. The method of claim 1, further comprising:
   encoding the sync word; and
   comparing the encoded sync word with the extracted sync word, the at least one predetermined criterion being a match between the encoded sync word and the extracted sync word within a distance of a specified number of bit errors, t.

6. The method of claim 1, wherein each binary vector is evaluated to determine a resemblance to a Classic Bluetooth compatible sync word within an error allowance of a specified number of bit errors, t.

7. The method of claim 1, further comprising:
determining a histogram of an extracted binary vector;
performing a symbol template correlation based at least in part on the histogram; and
determining a frequency offset and a corresponding DC offset of the binary vector based at least in part on the template correlation.

8. The method of claim 7, wherein the symbol template is based on an eye diagram, the eye diagram being based on a symbol rate and a symbol duration.

9. The method of claim 8, wherein when the eye diagram has an eye a presence of a Bluetooth-compliant packet is declared.

10. The method of claim 7, wherein the histogram has a size that is based on a number of samples per symbol and a number of frequency bins in the histogram.

11. A receiver configured for blind detection of a lower address part (LAP) of received data packets, the receiver having processing circuitry configured to:
extract binary vectors from a received signal;
for each binary vector:
extract a synchronization (sync) word from the binary vector;
determine a lower address part (LAP) based on the sync word; and
when the sync word satisfies at least one predetermined criterion, output the LAP and declare a detected packet.

12. The receiver of claim 11, wherein the processing circuitry is further configured to:
encode a first candidate sync word, the encoded sync word being based on the LAP; and
compare the encoded sync word to the first candidate sync word, the at least one predetermined criterion being a match between the encoded sync word and the extracted sync word within a distance of a specified number of bit errors, t.

13. The receiver of claim 12, wherein the first candidate sync word is based at least in part on at least one of a symbol timing phase, a DC offset, and a frequency offset.

14. The receiver of claim 11, wherein the processing circuitry is further configured to:
decode the extracted sync word to a closest discernible codeword, the at least one predetermined criterion being discernment of the codeword.

15. The receiver of claim 11, wherein the processing circuitry is further configured to:
encode the sync word; and
compare the encoded sync word with the extracted sync word, the at least one predetermined criterion being a match between the encoded sync word and the extracted sync word within a distance of a specified number of bit errors, t.

16. The receiver of claim 11, wherein each binary vector is evaluated to determine a resemblance to a Classic Bluetooth compatible sync word within an error allowance of a specified number of bit errors, t.

17. The receiver of claim 11, wherein the processing circuitry is further configured to:
determine a histogram of an extracted binary vector;
perform a symbol template correlation based at least in part on the histogram; and
determine a frequency offset and a corresponding DC offset of the binary vector based at least in part on the template correlation.

18. The receiver of claim 17, wherein the symbol template is based on an eye diagram, the eye diagram being based on a symbol rate and a symbol duration.

19. The receiver of claim 18, wherein when the eye diagram has an eye a presence of a Bluetooth-compliant packet is declared.

20. The receiver of claim 17, wherein the histogram has a size that is based on a number of samples per symbol and a number of frequency bins in the histogram.

* * * * *